US006245454B1

(12) United States Patent
Gocho et al.

(10) Patent No.: US 6,245,454 B1
(45) Date of Patent: Jun. 12, 2001

(54) FUEL CELL AND METHOD OF INSTALLING LININGS ON GAS MANIFOLDS OF FUEL CELL

(75) Inventors: Yoshitsugu Gocho, Fujisawa; Kotaro Iyasu, Fuchu; Yoshiyuki Abiru, Ichikawa; Toshio Konno, Yokohama, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/369,428

(22) Filed: Aug. 6, 1999

Related U.S. Application Data

(63) Continuation of application No. PCT/JP98/00525, filed on Feb. 9, 1998, now abandoned.

(30) Foreign Application Priority Data

Feb. 7, 1997 (JP) .................................................. 9-024649

(51) Int. Cl.⁷ ...................................................... H01M 8/02
(52) U.S. Cl. ................................................. 429/34; 429/37
(58) Field of Search ................................... 429/34–36, 37

(56) References Cited

U.S. PATENT DOCUMENTS 4,374,185 * 2/1983 Owers ..................................... 429/36

FOREIGN PATENT DOCUMENTS

| 4-114842 | 4/1992 | (JP) . |
|---|---|---|
| 4-138673 | 5/1992 | (JP) . |
| 6-59749 | 3/1994 | (JP) . |
| 6-176771 | 6/1994 | (JP) . |
| 3014147 | 5/1995 | (JP) . |
| 7-169500 | 7/1995 | (JP) . |
| 8-241728 | 9/1996 | (JP) . |

* cited by examiner

Primary Examiner—Stephen Kalafut
Assistant Examiner—Mark Ruthkosky
(74) Attorney, Agent, or Firm—Oblon, Spivak, McClelland, Maier & Neustadt, P.C.

(57) ABSTRACT

Gas manifolds which are excellent in both phosphoric acid proof and electric insulation and which have sufficient corrosion proof over a long period are provided. A resin sheet with high phosphoric acid proof is folded to have a size smaller than that of the corner sections of the inner plane of gas manifolds by the size corresponding to a thermal expansion, and the folded planes are thermally compressed in air tight to form box-shaped linings. These linings are applied to the inner planes of the gas manifolds. Patches are thermally compressed to the outer surface of the bottom section of the linings and each patch is fitted loosely with a male hook or a female hook. A female hook or a male hook for engaging with the hook on each patch is fitted on the inner plane of the gas manifolds at an opposing position. The linings can be fixed to the gas manifolds engageably and disengageably by these hooks.

34 Claims, 14 Drawing Sheets

FUEL CELL AND METHOD OF INSTALLING LININGS ON GAS MANIFOLDS OF FUEL CELL

CROSS-REFERENCE TO THE RELATED APPLICATIONS

This is a continuation application of Application No. PCT/JP98/00525, filed Feb. 9, 1998, now abandoned.

BACKGROUND OF THE INVENTION

The present invention relates to a fuel cell and relates more particularly to a fuel cell which has been improved to prevent a corrosion of a gas manifold due to phosphoric acid.

A fuel cell is used for generating electric energy based on an electrochemical reaction of hydrogen obtained by reforming a hydrocarbon fuel such as natural gas or methane gas with air as an oxidizer, both supplied to a main body of the fuel cell, in the presence of an electrolyte. The fuel cell has a laminated structure (a cell stacked structure) by a lamination of a plurality of single cells having the above-described power generating function.

FIG. 1 is a breakdown perspective diagram for showing the structure of a cell stack of a fuel cell which has been used conventionally. A single cell 1 of a fuel cell main body is structured by a fuel pole 3 for supplying hydrogen disposed at one side of the plane of a matrix layer 2 holding an electrolyte in the direction of an arrow A in the diagram, an air pole 4 for supplying air disposed at the other side of the plane in the direction of an arrow B in the diagram, grooved electrode materials 5 and 6 laminated on the fuel pole 3 and the air pole 4 respectively, and a separator 7 laminated on one of the grooved electrode materials 5 and 6. Each time when the unit cell 1 is laminated to form a plurality of unit cells, a cooling panel 8 is inserted between each unit cell to structure one sub-stack 9, and the sub-stack 9 is laminated by a large number to structure a cell stack 10.

Further, a clamping panel 11 is installed at the top section and the bottom section of the cell stack 10 respectively. The cell stack 10 and the upper and lower clamping panels 11 are fastened by a tie rod 12 to be integrated as a cell stack unit 13.

Further, a pair of fuel gas manifolds 15a and 15b and a pair of air gas manifolds 16a and 16b are disposed on mutually opposite side planes of the cell stack unit 13 of the above-described structure so that a fuel gas and air flow in mutually orthogonal directions, as shown in FIG. 2.

Further, a gasket 18 is provided at each contact plane between the cell stack unit 13 and each of the gas manifolds 15a, 15b, 16a and 16b respectively to prevent in advance an occurrence of a problem of a reduction in the power generating efficiency due to a leakage of air or a fuel gas.

When fuel and air are supplied to the gas manifolds 15a and 16a respectively, a part of phosphoric acid impregnated in the matrix layer 2 and the grooved electrode materials 5 and 6 for structuring the cell stack 10 is diffused into the flow of the fuel gas and air respectively and is then exhausted to the outside of the cell stack (that is, into the gas manifolds) in the state of a phosphoric acid vapor.

However, since the temperature of the gas manifolds is slightly lower than the temperature of the cell stack, a part of the phosphoric acid vapor exhausted into the gas manifolds is condensed and adheres to the inner wall of the gas manifolds. When the fuel gas and air including phosphoric acid are brought into direct contact with the inner side of gas manifolds made of metal, the gas manifolds made of metal are corroded significantly in a high-temperature state, so that there is a risk that the gas manifolds soon have holes.

In order to eliminate the above-described drawback, a method of coating the inner plane of each gas manifold with a fluororesin as disclosed in the U.S. Pat. No. 4,950,563 has been used, as a method of protecting the gas manifolds from the corrosion by phosphoric acid.

However, the method of coating a fluororesin on the inner plane of the gas manifolds has the following problems and, therefore, it has been difficult to completely prevent the gas manifolds from being corroded by phosphoric acid.

According to the method of coating a fluororesin on the inner plane of a gas manifold, there has been a problem that phosphoric acid enters inside from pin holes and a problem that there occurs a failure in the adhesion of the resin coating on the inner surface of the gas manifold due to a repeated change in the temperature by the starting and stopping of the operation of the fuel cell and changes in the load since the coefficient of linear expansion of the resin coating is as large as about ten times that of the gas manifold, which results in a removal of the coating from the surface of the gas manifold.

Further, there is a problem that since a paint film formed by coating has a relatively small thickness, phosphoric acid can easily penetrate into the paint film, which results in a corrosion of the base material. Thus, this method lacks in reliability. Further, in order to improve the reliability of the coating, it is necessary to increase the thickness of the paint film, which requires a repetition of heating, coating and cooling processes many times. This requires a large processings time and a large number of processing. Moreover, since the coating process forms a part of a series of the manufacturing process of the gas manifold, these increases in the processing time and the number of processings have interfered to reduce the manufacturing period.

Furthermore, if the coating is broken and peeled off during the operation of the fuel cell, it is not difficult to detect this occurrence in a short time. This further has a problem of generating a corrosion of the gas manifolds and a failure of electric insulation.

BRIEF SUMMARY OF THE INVENTION

It is a first object of the present invention to provide a fuel cell which is excellent in being phosphoric acid proof and electric insulation and which has a sufficient corrosion proof over a long period.

It is a second object of the present invention to provide a fuel cell in which a breaking of a lining can be prevented.

It is a third object of the present invention to provide a fuel cell which has a means for confirming the soundness of a lining.

It is a fourth object of the present invention to provide a reliable method of installing linings on gas manifolds of a fuel cell.

In order to achieve the above-described objects of the present invention, a fuel cell described in claim 1 of the invention has linings formed loosely on the inner phase of manifolds disposed on a side planes of a cell stack unit structuring the fuel cell, each lining having been formed by a phosphoric acid proof resin sheet by matching it with the shape of the inner plane of each gas manifold, wherein each lining is formed in advance to have a shape smaller than that of the inner plane of each gas manifold by a size substantially corresponding to the size of a thermal expansion of the lining during the operation of the fuel cell.

According to the invention having the above-mentioned structure, since the whole inner plane of a gas manifold can be covered with a lining formed by a phosphoric acid proof resin sheet that has been formed to match the shape of the inner plane of the gas manifold, it is possible to prevent the base material of the gas manifold made of metal from being corroded by phosphoric acid. Further, since the lining can be formed in advance to match the shape of the inner plane of the gas manifold, it becomes possible to manufacture the lining in a process different from the manufacturing process of the gas manifold, so that the period of manufacturing can be reduced.

Further, even if the lining has swollen due to an increase in the temperature of the inside of the gas manifold, it is possible to prevent the lining from being applied with a load that generates a crack because the lining matches the size and shape of the gas manifold.

The invention provides a fuel cell, wherein the phosphoric acid proof resin sheet for structuring the lining is either a PTFE (perfluoroalkoxyethylene-tetrafluoroethlene copolymer) resin sheet or an FEP (hexafluoropropylene-tetrafluoroethylene copolymer) resin sheet.

Further, the invention provides a fuel cell, wherein the phosphoric acid proof resin sheet for structuring the lining is a PTFE (polychlorotetrafluoroethylene) resin sheet.

According to the invention having the above-mentioned structure, it becomes possible to form a lining with small volume of transmission of phosphoric acid and with excellent heat-resistance temperature and excellent mechanical strength.

The invention provides a fuel cell, wherein the phosphoric acid proof resin sheet for structuring the lining is provided with either female hooks or male hooks and the inner plane of the gas manifold has either male hooks or female hooks at predetermined positions at which the hooks are engaged with the hooks provided on the lining.

According to the invention having the above-mentioned structure, it is possible to support the lining with the gas manifold engageably and disengageably by a simple fixing means.

The invention provides a fuel cell, wherein the phosphoric acid proof resin sheet for structuring the lining is provided with patches with holes and either female hooks or male hooks are movably fitted between the sheet and the patches.

According to the invention having the above-mentioned structure, since the lining can be fitted loosely to the gas manifold, it becomes possible to absorb a difference between the thermal expansion of the lining and the thermal expansion of the gas manifold.

The invention provides a fuel cell, wherein the phosphoric acid proof resin sheet for structuring the lining has a thickness of 0.1 mm to 1 mm.

According to the invention having the above-mentioned structure, it becomes possible to form a lining which has a reduced transmission volume of phosphoric acid and which maintains excellent mechanical strength and excellent electric insulation.

The invention provides a fuel cell, wherein the phosphoric acid proof resin sheet for structuring the lining has corner sections each having a joining thickness of 1 mm to 10 mm.

According to the invention having the above-mentioned structure, it becomes possible to improve the strength of the joining section of the lining.

The invention provides a fuel cell, wherein the phosphoric acid proof resin sheet for structuring the lining has its corner sections thermally compressed at a temperature not lower than a melting point temperature of the resin sheet.

According to the invention having the above-mentioned structure, since the molecules between two sheets are intertwined sufficiently by a thermal compression at a temperature not lower than the melting point temperature, the corner sections of the phosphoric acid proof resin sheet can be joined completely.

The invention provides a fuel cell, wherein the phosphoric acid proof resin sheet for structuring the lining has its joining sections joined by impulse welding.

According to the invention having the above-mentioned structure, the junction sections of the phosphoric acid proof resin sheet for structuring the lining can be joined in a short time, with a beautiful finishing and in a stable joining without variations in the joint strength. Further, it becomes possible to join under the conditions of a relatively wide range of heating temperature, heating time and compressive plane pressure at the time of heating respectively.

The invention provides a fuel cell, wherein the heating temperature at the time of joining by impulse welding is set within a range from a melting point temperature of the phosphoric acid proof resin sheet for structuring the lining to 400° C.

Further, the invention provides a fuel cell, wherein the heating temperature at the time of joining by impulse welding is set between 5 seconds and 300 seconds.

According to the invention having the above-mentioned structure, since a secure joining can be achieved by suitably setting the joining conditions of the impulse welding, it becomes possible to improve the strength of the lining.

The invention provides a fuel cell, wherein at the time of carrying out the impulse welding, a PFA (perfluoroalkoxyethylene-etrafluoroethlene copolymer) film having a thickness of 0.01 to 0.04 mm is sandwiched between joining planes of the phosphoric acid proof resin sheet for structuring the lining.

According to the invention having the above-mentioned structure, since a thermally fused PFA film having a small thickness functions as an adhesive, it becomes possible to increase the joint strength obtained by the impulse welding.

The invention provides a fuel cell, wherein the compressive plane pressure at the time of joining by impulse welding is set at 0.05 to 0.2 MPa.

According to the invention having the above-mentioned structure, since the molecules between two sheets are intertwined sufficiently, the phosphoric acid proof resin sheets can be joined completely.

The invention provides a fuel cell, wherein the cooling temperature at the time of joining by impulse welding is set at a level not higher than a glass transition temperature of the phosphoric acid proof resin sheet for structuring the lining.

According to the invention having the above-mentioned structure, since a state of caking can be established by cooling at a temperature not higher than the glass transition temperature, it becomes possible to improve the line joint strength.

The invention provides a fuel cell, wherein a pressure monitoring unit which can monitor the pressure between the lining and the gas manifold is provided.

According to the invention having the above-mentioned structure, it becomes possible to monitor a soundness of the lining.

The invention provides a fuel cell, wherein the lining is formed in a box shape with a brim after cut portions of four corner joining sections of the phosphoric acid proof resin sheet have been disconnected at an angle of 138±3 degrees, with the cut portions faced together and joined by compression.

According to the invention having the above-mentioned structure, it is possible to form a lining which matches the shapes of the four corners and the brim of the gas manifold.

The invention provides a fuel cell, wherein the flange section for exhausting a gas of the gas manifold is fitted with a flange cover.

The invention provides a fuel cell, wherein the flange cover is joined by thermal compression with the bottom plane of the phosphoric acid proof resin sheet for structuring the lining.

The invention provides a fuel cell, wherein the flange cover is formed by pressing an end section at an opening side of the phosphoric acid proof resin sheet formed in a ring shape for structuring the lining.

The invention provides a fuel cell, wherein the flange cover is structured by a PFA (perfluoroalkoxyethylene-tetrafluoroethlene copolymer) resin sheet.

According to the invention having the above-mentioned structures, it is possible to prevent the flange section from being corroded by phosphoric acid by installing a flange cover in the flange section of the gas manifold as well.

The invention provides a fuel cell, wherein the lining is also installed in a divider section for separating an inside space formed by fuel-side gas manifolds at a fuel side.

According to the invention having the above-mentioned structure, since the divider section of each of the fuel-side gas manifolds is also covered by the lining, it is possible to prevent completely the fuel-side gas manifolds from being corroded by phosphoric acid.

The invention provides a fuel cell, wherein an external peripheral section of the phosphoric acid proof resin sheet is bent along a brim section at a peripheral section of the gas manifold and is sandwiched and fixed together with the gas manifold brim section by clamping.

According to the invention having the above-mentioned structure, since the peripheral end section of the gas manifold can also be covered completely by the lining prepared by the phosphoric acid proof resin sheet, it becomes possible to effectively prevent the metal base material of the gas manifold from being corroded by phosphoric acid.

The invention provides a fuel cell, wherein the thickness of the phosphoric acid proof resin sheet for structuring the lining is changed based on an exhaust quantity of phosphoric acid at each gas manifold disposed on the side plane of the cell stack unit.

The invention provides a fuel cell, wherein the thickness of the lining for the gas manifold at the air supplying side is made smaller than the thickness of the linings for the other sections.

According to the invention having the above-mentioned structures, it becomes possible to prevent transmission of phosphoric acid rationally and securely by changing the thickness of the resin sheet based on the exhaust quantity of phosphoric acid at each gas manifold disposed on the side plane of the cell stack unit.

The invention provides a fuel cell, wherein a heat-resisting coating is coated on at least the inner plane of each gas manifold.

According to the invention having the above-mentioned structure, it becomes possible to have a smoother contact plane between the lining and the metal-made gas manifold by coating a heat-resisting coating on at least the inner plane of each gas manifold.

The invention provides a fuel cell, wherein the pressure monitoring unit is structured by a pressure drawing tube of which one side end opening is connected to a pressure measuring plug provided on the gas manifold and the other side end opening is inserted into water.

The invention provides a fuel cell, wherein a U-shaped disposing section is formed in a state that the other side end opening of the pressure drawing tube is opened to the atmosphere and water is filled in at least the U-shaped disposing section.

According to the invention having the above-mentioned structures, it becomes possible to monitor the soundness of the lining.

The invention provides a fuel cell, wherein the pressure monitoring unit is structured by a pressure drawing tube of which one side end opening is connected to a pressure measuring plug provided on the gas manifold and the other side end opening is connected with a pressure gauge.

Further, the invention provides a fuel cell, wherein the pressure monitoring unit is structured by a pressure drawing tube of which one side end opening is connected to a pressure measuring plug provided on the gas manifold and the other side end opening is connected with a flow meter.

According to the invention having the above-mentioned structures, it becomes possible to automatically monitor the soundness of the lining through out the time.

The invention provides a fuel cell, wherein each side plane covering section of the phosphoric acid proof resin sheet for structuring the lining is extended and is connected with an end section of the lining of an adjacent gas manifold, to cover each corner section of the cell stack unit.

According to the invention having the above-mentioned structures, it becomes possible to prevent a leakage of a flammable gas from the cell stack unit.

The invention provides a method of installing linings on gas manifolds of a fuel cell, which is a reflection of the invention as a method. This method includes the forming of linings on the inner planes of manifolds disposed on side planes of a cell stack unit structuring a fuel cell, by forming a phosphoric acid proof resin sheet in a box shape to match the shape of each gas manifold, and by forming each lining to have a shape smaller than that of the inner plane of each gas manifold by a size substantially corresponding to the size of a thermal expansion of the lining during the operation of the fuel cell.

According to the invention having the above-mentioned structure, it becomes possible to prevent the metal-made base material of the gas manifold from being corroded by phosphoric acid because the whole inner plane of each gas manifold can be covered by the lining prepared by the phosphoric acid proof resin sheet.

The invention provides a method of installing linings on gas manifolds of a fuel cell, wherein an external peripheral section of the phosphoric acid proof resin sheet is bent along a brim section at a peripheral section of the gas manifold and is sandwiched and fixed together with the gas manifold brim section by clamping.

According to the invention having the above-mentioned structure, since the peripheral end section of the gas manifold can also be covered completely by the lining prepared by the phosphoric acid proof resin sheet, it becomes possible to prevent the metal base material of the gas manifold from being corroded by phosphoric acid more effectively.

The invention provides a method of installing linings on gas manifolds of a fuel cell, which is a reflection of the invention as a method. This method includes a mounting of a lining on each gas manifold by forming a phosphoric acid proof resin sheet in a box shape to match the shape of each gas manifold, installing either female hooks or male hooks on the phosphoric acid proof resin sheet for structuring the lining, installing either male hooks or female hooks to be engaged with the hooks installed on the lining, at predetermined positions on the inner plane of the gas manifold, and engaging both hooks together.

According to the invention having the above-mentioned structure, since the lining structured by the phosphoric acid proof resin sheet can be mounted engageably and disengageably on the gas manifold by simple fixing means, it becomes possible to prevent the metal base material of the gas manifold from being corroded by phosphoric acid.

The invention provides a method of installing linings on gas manifolds of a fuel cell, wherein an external peripheral section of the phosphoric acid proof resin sheet for structuring the lining is bent along a brim section at a peripheral section of the gas manifold and is sandwiched and fixed together with the gas manifold brim section by clamping.

According to the invention having the above-mentioned structure, since the peripheral end section of the gas manifold can also be covered completely by the lining prepared by the phosphoric acid proof resin sheet, it becomes possible to prevent the metal base material of the gas manifold from being corroded by phosphoric acid more effectively.

The invention provides a fuel cell, wherein the lining is formed by forming the phosphoric acid proof resin sheet in a box shape by blow forming.

According to the invention having the above-mentioned structure, when the lining is formed in a box shape by blow forming, it becomes possible to obtain easily a highly reliable lining to be mounted on the gas manifold without any joining section.

The invention provides a fuel cell, wherein the heating temperature at the time of blow forming the lining is set in a range not lower than the softening point and not higher than the melting point of the phosphoric acid proof resin sheet respectively.

According to the invention having the above-mentioned structure, when the heating temperature at the time of blow forming the lining is set within a proper temperature range, it becomes possible to obtain a uniform and high-precision lining in an easy forming operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention, in which.

DETAILED DESCRIPTION OF THE INVENTION

Embodiments of the present invention will be explained below with reference to the drawings.

1. First Mode of Implementation

According to the present mode of implementation, the whole inner plane of a gas maniford for a fuel cell is covered with a lining prepared by a phosphoric acid prood resin sheet.

(1-1. Structure of a first mode of implementation)

Figure 1:
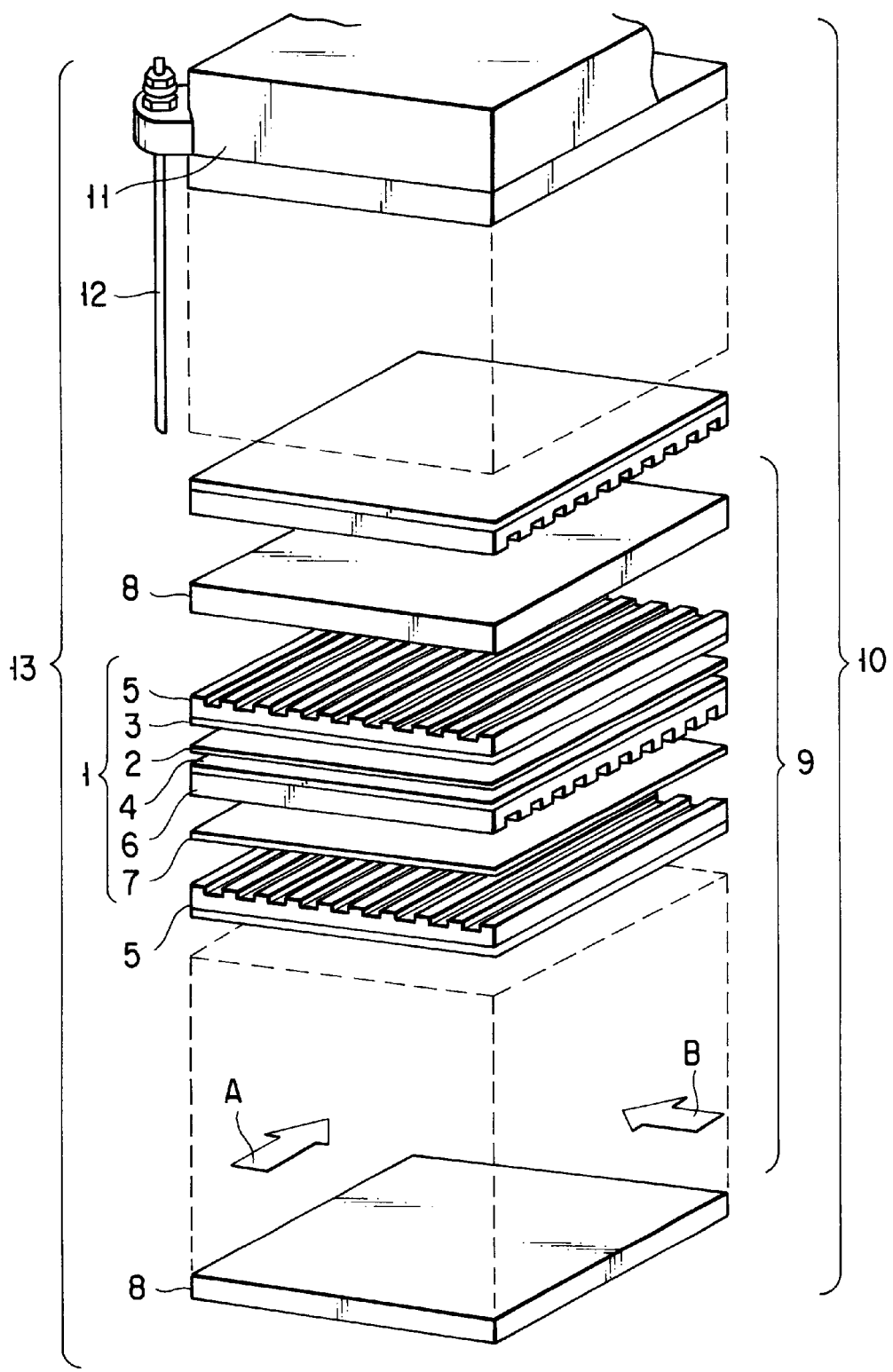
FIG. 1 is a breakdown perspective diagram for showing a structure of a cell stack of a fuel cell.
Figure 2:
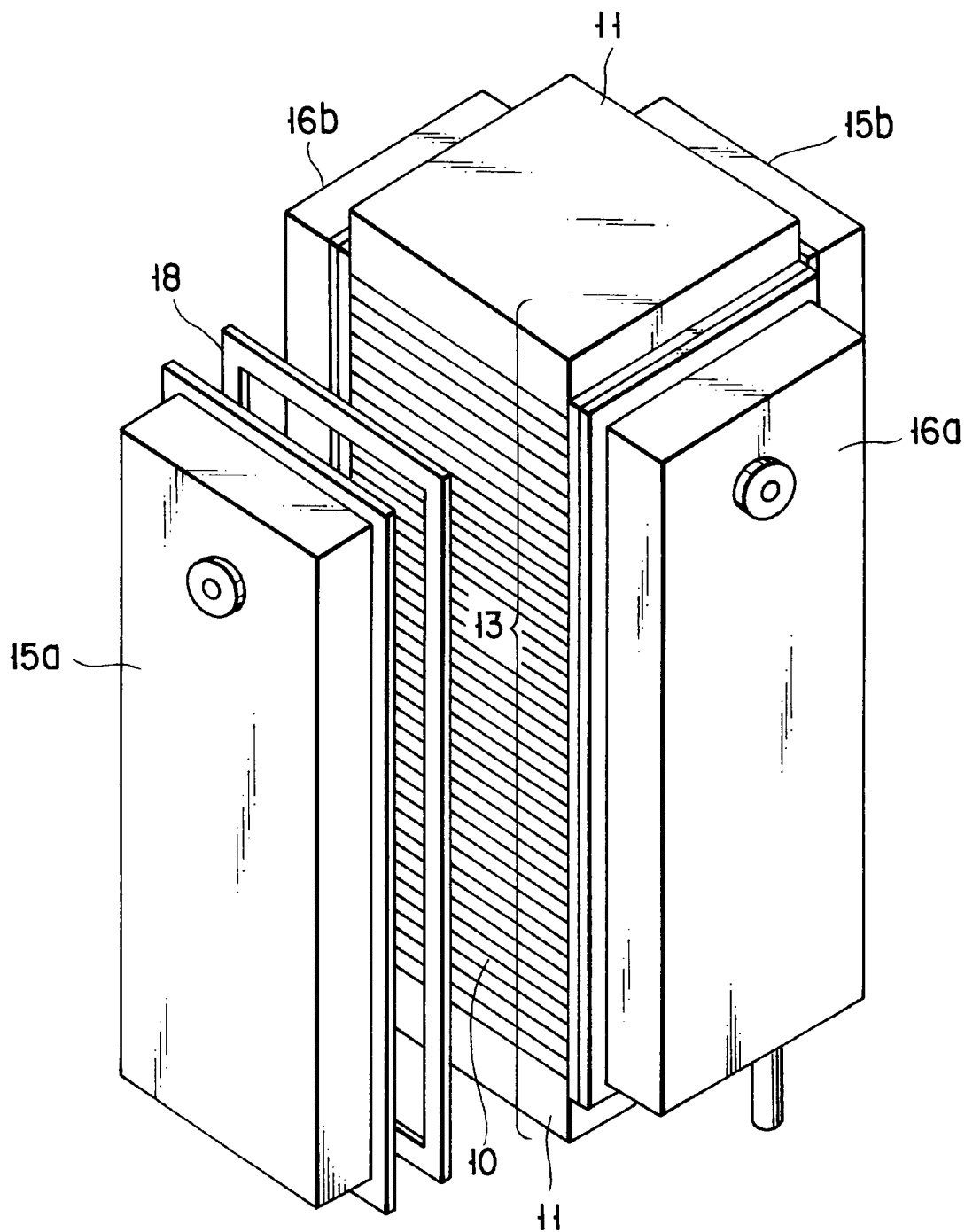
FIG. 2 is a perspective diagram for showing a state that a gas manifold is mounted on a fuel cell stack unit.
Figure 3:
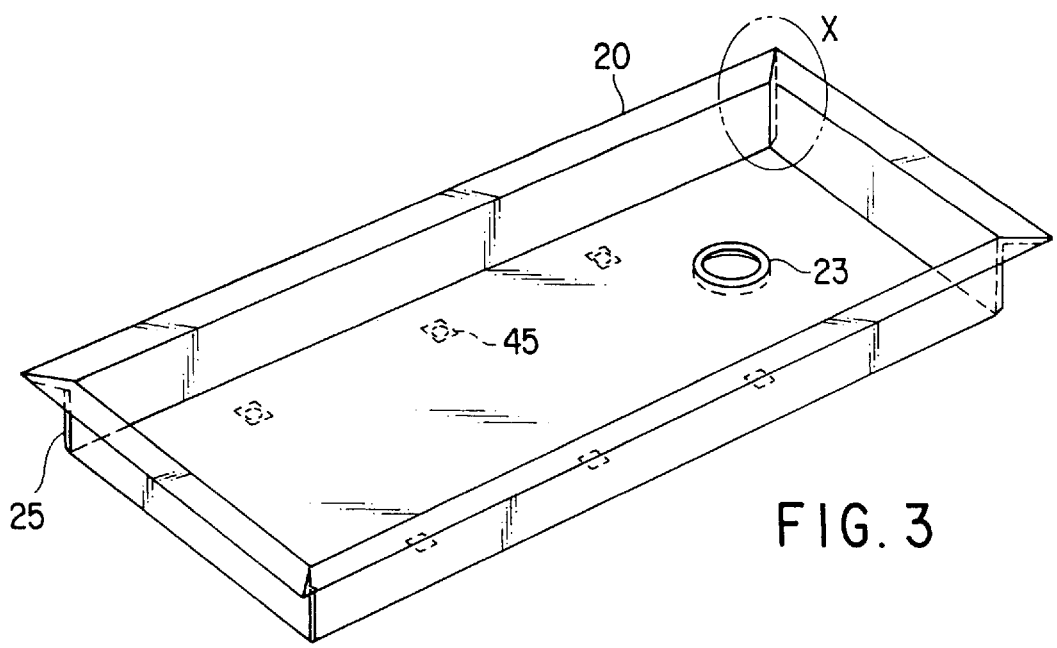
FIG. 3 is a perspective diagram for showing an air-side lining to be applied to the gas manifold according to the present invention.
Figure 4:
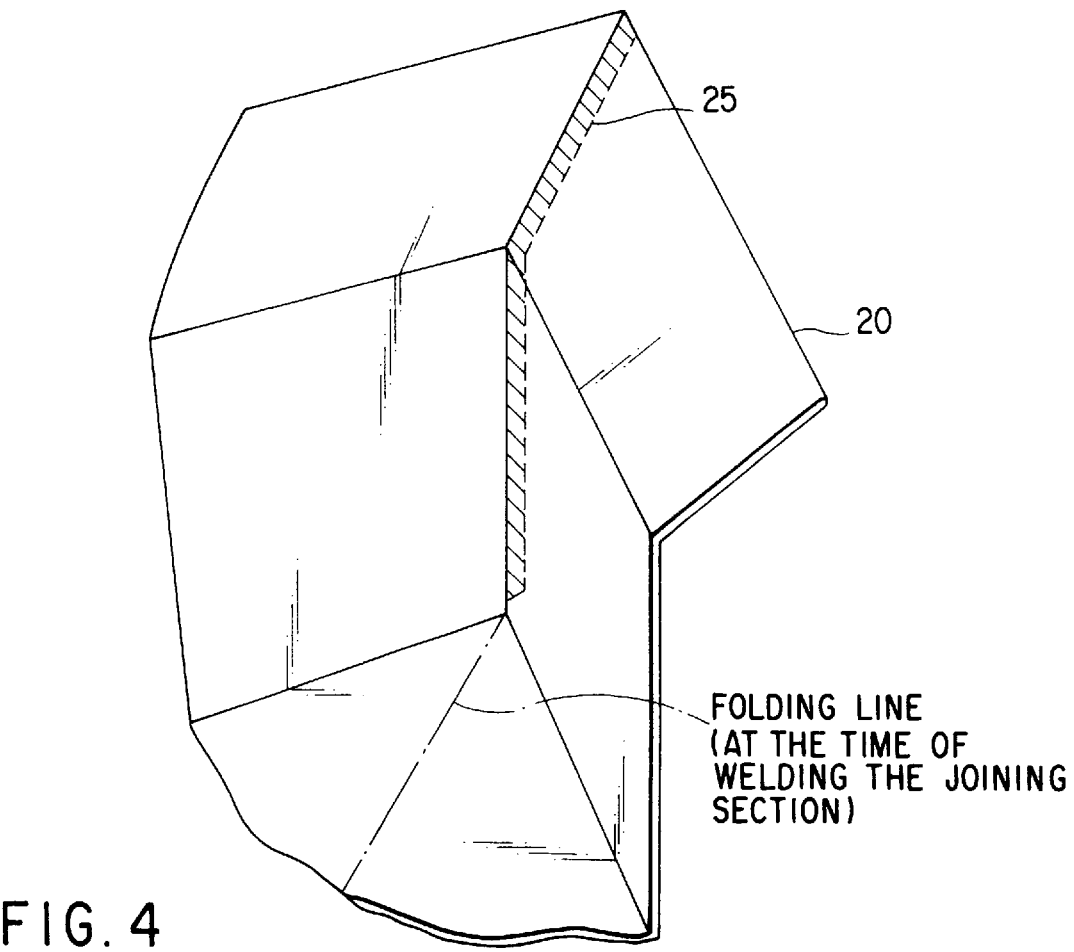
FIG. 4 is an enlarged diagram of an X section of the air-side lining shown in FIG. 3.

According to the present mode of implementation, a phosphoric acid prook resin sheet is formed to match the shape of the inner plane of a gas manifold, and predetermined positions (four corners, flange section, etc.) are joined to form a box-shaped lining 20, as shown in FIG. 3. Then, the lining 20 is applied to the inner plane of each gase manifold to be mounted on each of four side planes of a cell stack unit 13 as shown in FIG. 4, thus completing the lining. When the phosphoric acid prook resin sheet is formed to match the shape of the inner plane of the gas manifold, the lining is formed to have a shape smaller than the shape of the inner plane of the manifold by substantially the equivalent size corresponding to a thermal expansion of the lining at the time of the operation of the fuel cell.

FIG. 3 shows the lining to be mounted on the inner plane of the air-side gas manifold, and a flange cover 23 and a patch 45 to be described later are installed at predetermined positions of the lining. The lining 20 is formed in a box shape by joining a joining section 25 provided at a folding section corresponding to the four corners and a brim section of the gas manifold, as shown in FIG. 4.

Figure 5:
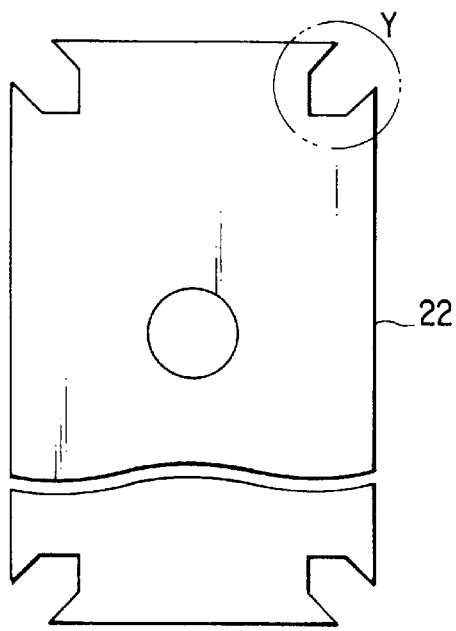
FIG. 5 is an exploded diagram of a PFA resin sheet for structuring the air-side lining shown in FIG. 3.
Figure 6:
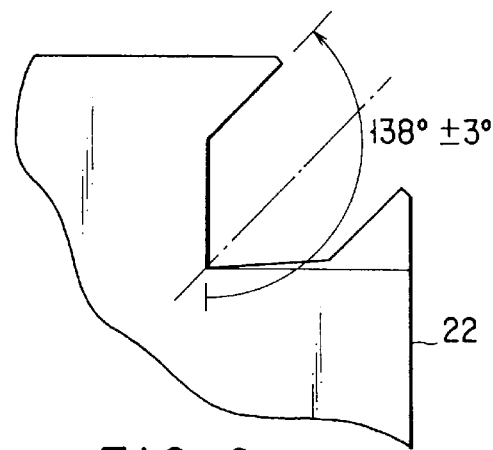
FIG. 6 is an enlarged diagram of a Y section of the PFA resin sheet for the air-side lining shown in FIG. 5.
Figure 7:
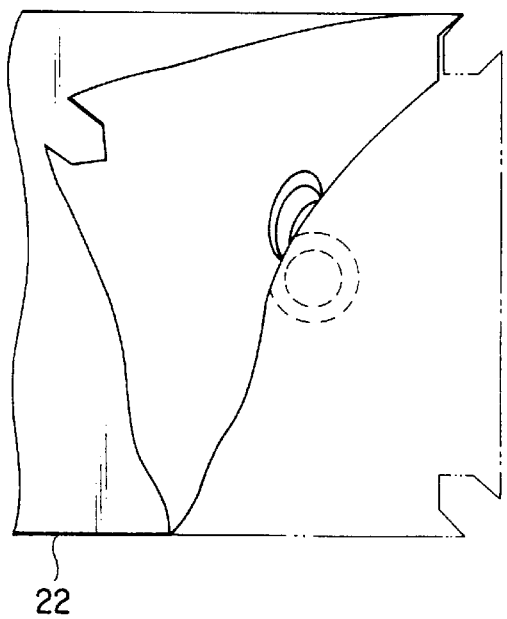
FIG. 7 is a perspective diagram for showing a state that the PFA resin sheet for the air-side lining shown in FIG. 5 is bent at the time of a thermal joining.
Figure 8:
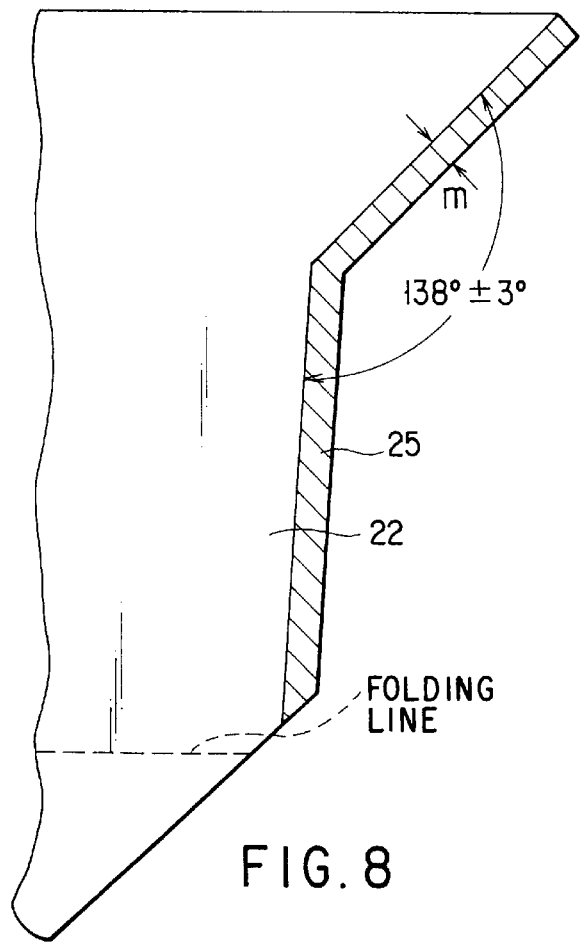
FIG. 8 is an enlarged diagram of a main portion of FIG. 7 for showing the state that the PFA resin sheet for the air-side lining is bent at the time of a thermal joining.

Further, FIG. 5 is an exploded diagram of a PFA resin sheet 22 for structuring an air-side lining, and FIG. 6 shows an enlarged diagram of a Y section in FIG. 5. As shown in FIG. 6, the joining section 25 is cut at an angle of 138±3 degrees to match the shape of the four corner sections and the brim section of the gas manifold. Then, as shown in FIGS. 7 and 8, the PFA resin sheet 22 for structuring the lining is joined by compression by mutually combining the cut sheet portions at the joining section 25. In the diagram, "m" represents the thickness of joining.

Figure 9:
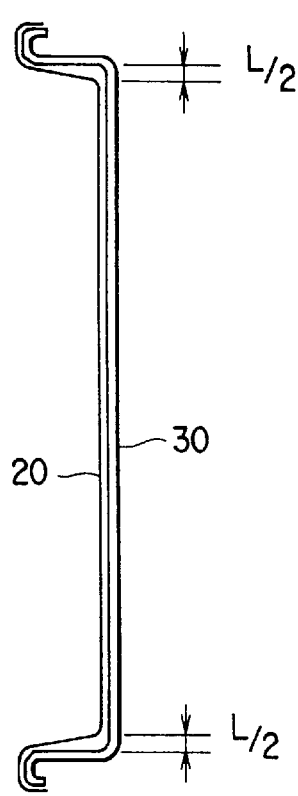
FIG. 9 is a cross-sectional diagram for showing a state that a lining is mounted on the gas manifold.

More specifically, the lining 20 prepared by the phosphoric acid proof resin sheet is formed in a box shape by joining the cut poritions at the four corners in consideration of the difference between the thermal expansion of the lining 20 and the thermal expansion of the inner plane of the gas manifold, so that the size of the lining is smaller than that of the gas manifold 30 by the difference of expansion, that is L/2, as shown in FIG. 9.

(1-1-1. Material of the phosphoric acid proof resin sheet)

For the phosphorix acid proof resin sheet for structuring the lining of the present invention, a sheet allowing less trnsmissivity of phosphoric acid is desirable as the lining sheet because the sheet can have a small thickness and is also economical. From this viewpoint, the inventors of the present invention have investigated the transmissivity of phosphoric acid through a PFA (perfluoroalkoxyethylene-tetrafluoroethlene copolymer) resin sheet, a PTFE (polychlorotetrafluoroethylene) resin sheet and an FEP (hexafluoropropylene-tetrafluoroethylene copolymer) resin sheet, in order to select a phosphoric acid proof resin sheet which is suitable for structuring the lining.

Figure 10:
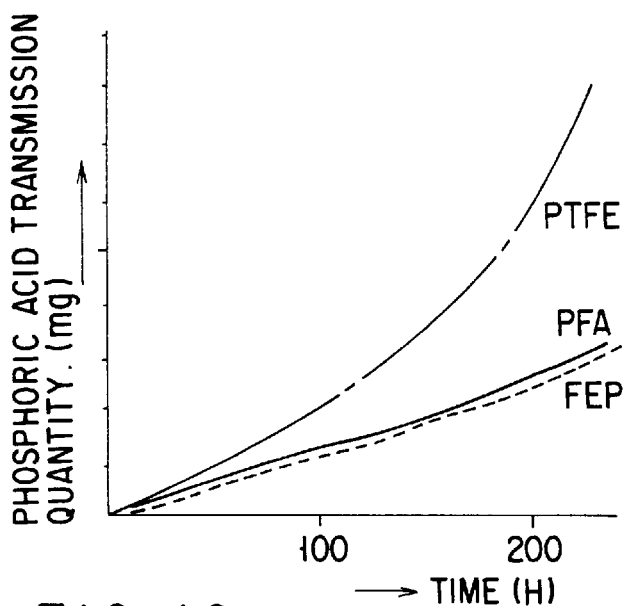
FIG. 10 is a diagram for showing the quantity of transmission of phosphoric acid through various kinds of resin sheets.

A result of the investigation is as shown in FIG. 10. It is desirable that a PFA resin sheet or an FEP resin sheet which allow lower transmissivity of phosphoric acid is used as the material for the lining sheet. Although both the PFA resin sheet and the FEP resin sheet show almost the same transmissivity levels as shown in FIG. 10, the PFA resin sheet excels over the FEP resin sheet in heat resistance temperature and mechanical strength. Therefore, it is more desirable to use the PFA resin sheet. Further, although the PTFE resin sheet is inferior to the PFA resin sheet in transmissivity, the PTFE resin sheet excels over the PFA resin sheet in mecahnical strength. Therefore, the PTFE resin sheet can also be used effectively for the material of the lining sheet in the case the fuel cell is stopped and started frequently.

(1-1-2. Structure of the flange section)

Figure 11:
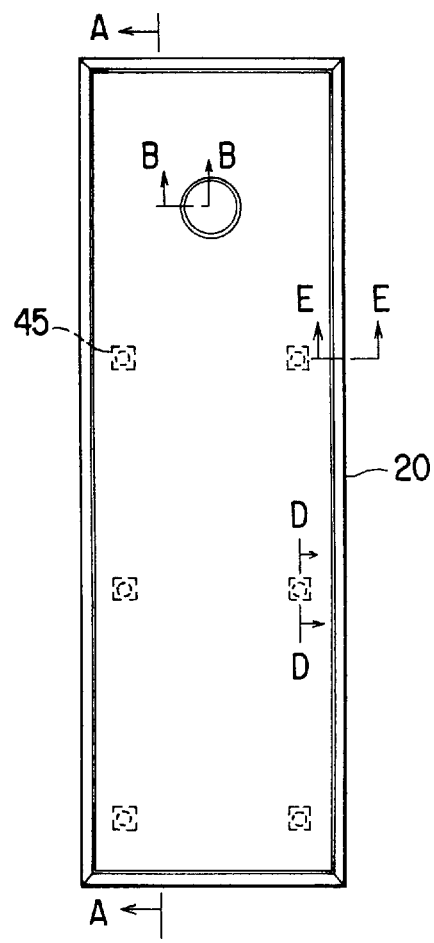
FIG. 11 is a top plan view for showing a structure of the air-side lining.
Figure 12:
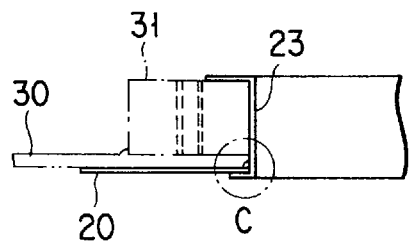
FIG. 12 is a cross-sectional diagram cut along a line B—B in FIG. 11.
Figure 13:
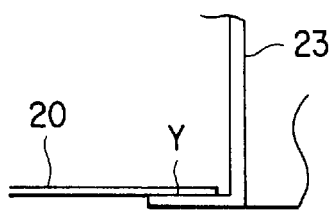
FIG. 13 is an enlarged diagram of a section C in FIG. 12.

FIG. 11 is a top plan view of a lining for an air-side gas manifold (hereinafter to be referred to as an air-side lining) 20, FIG. 12 is a cross-sectional diagram of a flange section cut along a line B—B shown in FIG. 11, and FIG. 13 is an enlarged diagram of a section C in FIG. 12.

More specifically, as shown in FIGS. 11 to 13, a flange 31 of the gas manifold 30 is integrally formed in the gas manifold 30 by welding, and the lining 20 is cut in a circular shape to match the position and shape of the flange 31 os the gas manifold. On the other hand, a flange cover 23 is lined on the inner plane of the flange 31 of the gas manifold, and the flange cover 23 and the lining 20 are connected at a Y section shown in FIG. 13.

Figure 14A:
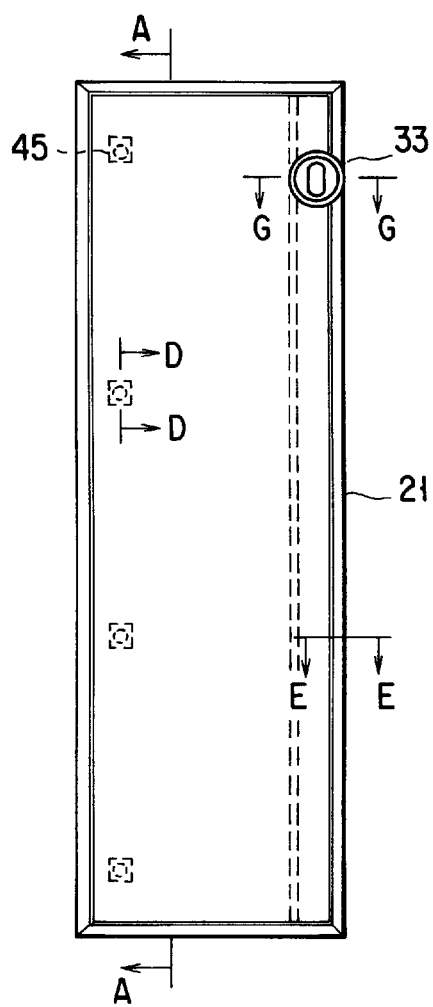
FIG. 14A is a top plan view for showing a structure of a lining at the fuel exit side.
Figure 14B:
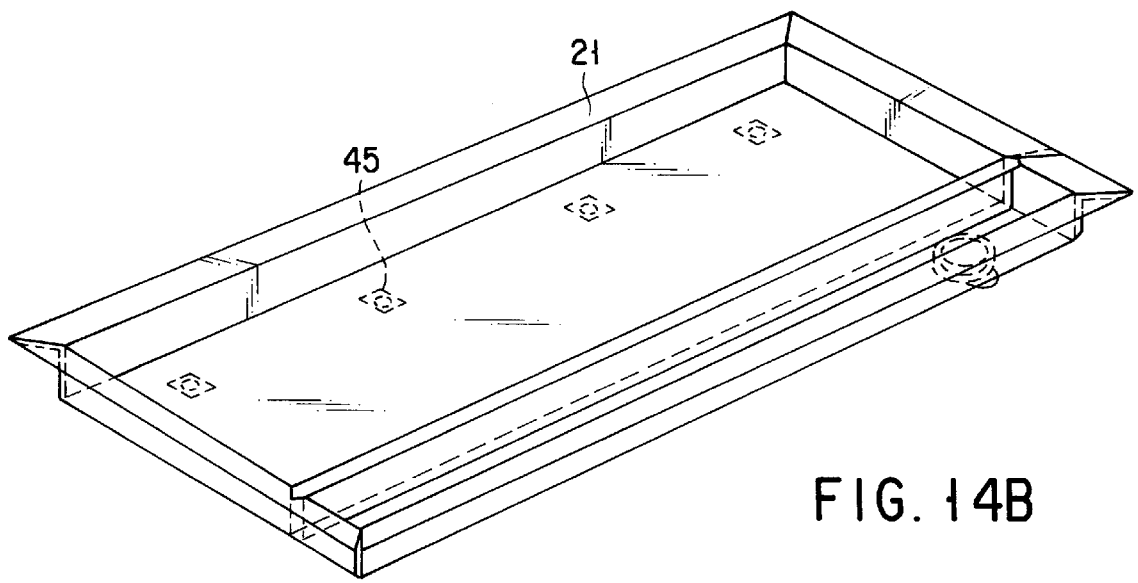
FIG. 14B is a perspective view for showing the structure of the lining at the fuel exit side.
Figure 15A:
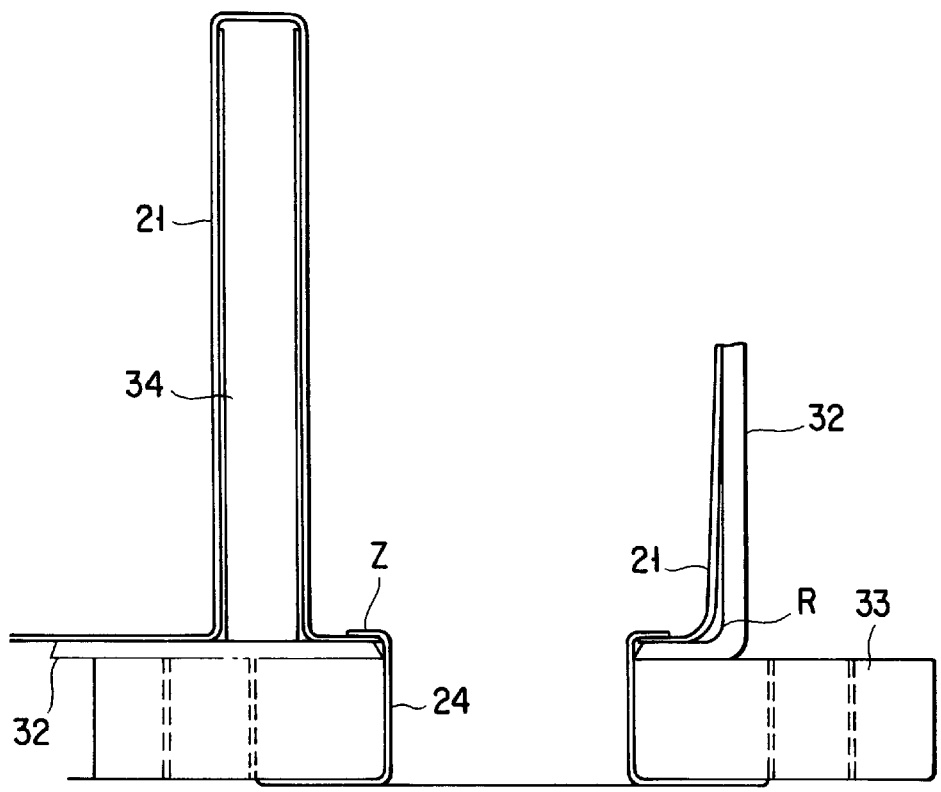
FIG. 15A is a cross-sectional diagram for showing a structure of a flange section of a gas manifold at the fuel exit side.

FIG. 14A is a top plan view for showing a ining for a gas manifold at the fuel exit side (hereinafter to be referred to as fuel-side lining) 21, and FIG. 14B is a perspective diagram of the same. FIG. 15A is a cross-sectional diagram of a fuel exit flange section cut along a line G—G in FIGS. 14A, 14B, and FIG. 15B is a perspective diagram for showing the fuel exit flange section.

Figure 15B:
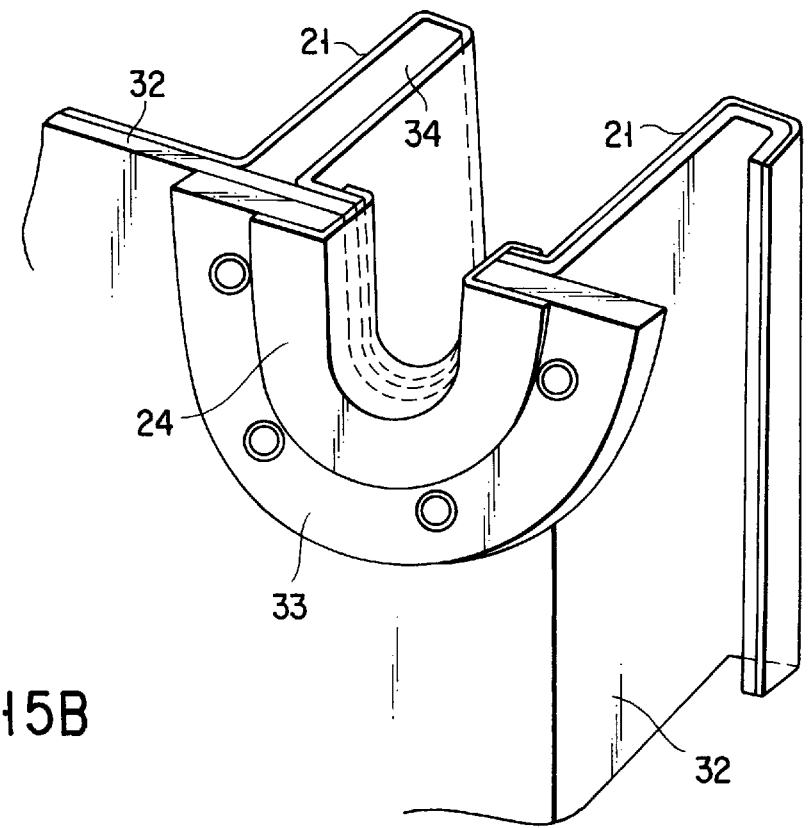
FIG. 15B is a perspective diagram for showing a structure of the flange section of the gas manifold at the fuel exit side.

As shown in FIGS. 14A, 14B, 15A and 15B, a flange 33 of a fuel exit side gas manifold 32 is formed integrally with the gas manifold 32 by welding, and the lining 21 is cut in a circular shape to match the position and shape of the flange 33 of the gas manifold. On the other hand, a flange cover 24 is lined on the inner plane of the flange 33 of the gas manifold, and the flange cover 24 and the ining 21 are joined together at a Z section shown in FIG. 15A. In FIGS. 15A and 15B, 34 denotes a divider provided to turn a fuel gas, and the inner plane of the divider is also covered by the lining 21 (refer to the next paragraph).

A mechanically processed product of PTFE is used for the flange covers 23 and 24, and this product is joined by thermal fusion with the bottom planes of the phosphoric acid proof resin sheets 20 and 21 for the lining respectively to form the flange section of the lining as described above.

Each of the flange covers 23 and 24 can also be prepared by forming a phosphoric acid proof resin sheet for lining in a ring shape and then forming a brim by press forming the end section of the opening side of the ring. According to this method, economics is improved substantially. Further, when the PFA resin sheet is used as the material for the flange covers 23 and 24, the transmission proof of phosphoric acid is improved and the flange cover can have a smaller thickness. This further improves the joining.

(1-1-3. Structure of the divider section)

As shown in FIGS. 15A and 15B, a divider 34 for separating the internal space of the gas manifold in a vertical axis direction to turn the fuel gas is provided in the fuel exit side gas manifold 32. The fuel side lining 21 also covers this divider section.

Figure 16:
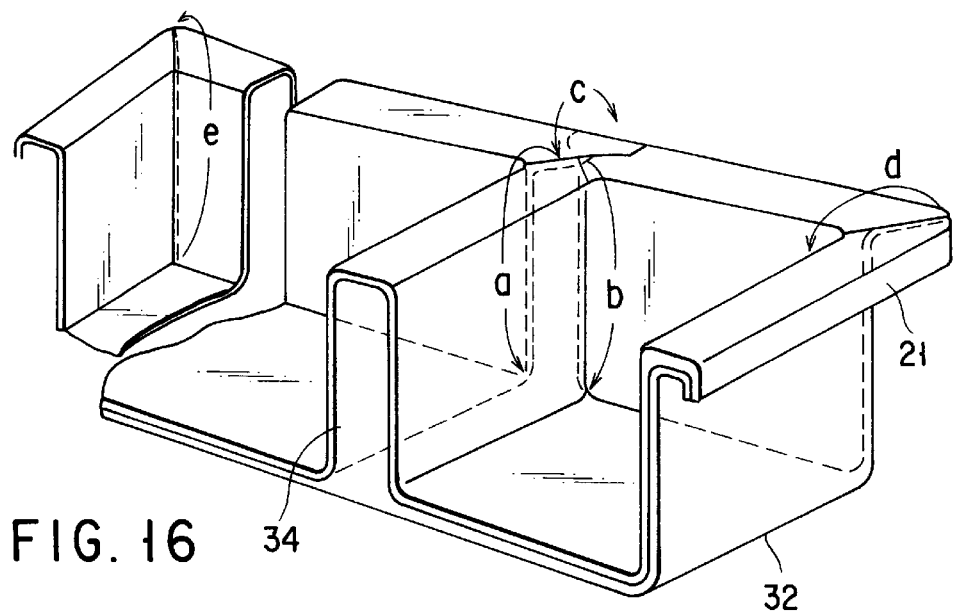
FIG. 16 is a perspective diagram for showing a state that a lining is applied to a divider section of the fuel-side gas manifold.

FIG. 16 is a perspective diagram for showing the state that the fuel side lining 21 covers the fuel exit side gas manifold 32. In other words, the fuel side lining 21 is formed and joined to cover also the portion of the divider 34 for separating the space inside the fuel gas manifold 32 into two chambers. In the diagram, a to e denote the sequence of joining the fuel side lining 21.

(1-1-4 Structure of the gas manifold peripheral end section)

Figures 17A, 17B:
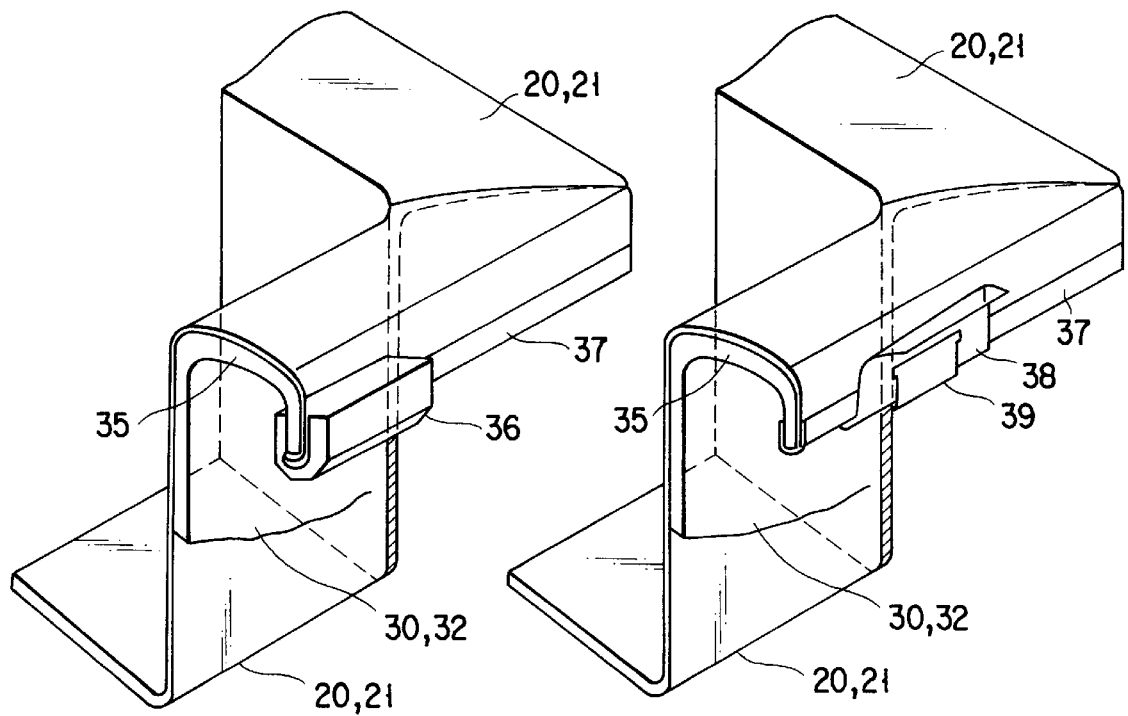
FIGS. 17A and 17B are cross-sectional perspective diagrams for showing the peripheral section of the gas manifold or the cross section cut along a line E—E in FIGS. 11 and 14.

FIGS. 17A and 17B are cross-sectional perspective diagrams for showing the peripheral section of the gas manifold corresponding to the portion of the cross section cut along a ine E—E in FIGS. 11 and 14A.

More specifically, as shown in FIG. 17A, at the peripheral end sections of the gas manifolds 30 and 32, the linings 20 and 21 are bent to cover the peripheral end sections of the gas manifolds respectively, and the linings 20 and 21 are clamped by plastic clamps 36 having a U-shaped cross section with a suitable distance therebetween, to fix the linings 20 and 21 to the gas manifolds 30 and 32 respectively.

Further, as shown in FIG. 17B, it is also good to arrange such that the linings 20 and 21 are bent to cover the peripheral end sections of the gas manifolds, and the linings 20 and 21 are clamped by metal clamps 39 via PFA strip sheets 38 with a suitable distance between the metal clamps, to fix the linings 20 and 21 to the gas manifolds 30 and 32 respectively.

Further, at the peripheral end section of the linings 20 and 21 respectively, a heat-resisting tape 37 is fitted on the metal and is also wound around a lip section 35 of the gas manifolds 30 and 32 together with the linings 20 and 21 and fixed together.

(1-1-5. Means for fixing the gas manifolds and the linings)

Figure 18:
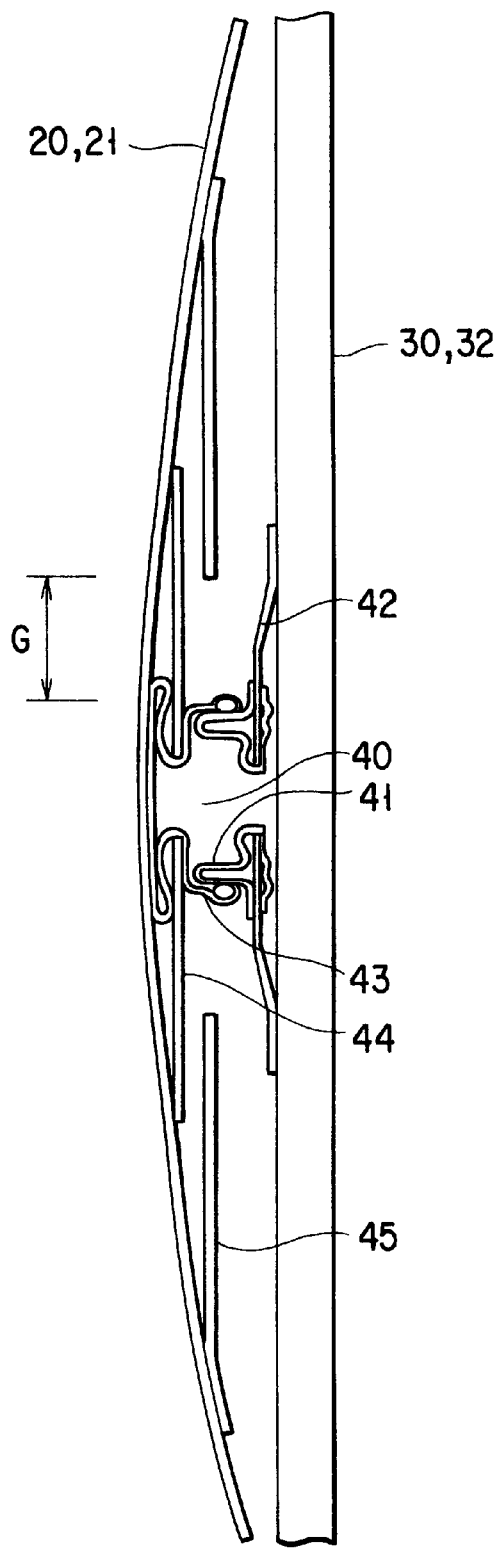
FIG. 18 is a cross-sectional diagram for showing a structure of a hook section for fixing the lining, or a cross section cut along a line D—D in FIGS. 11 and 14.
Figure 19:
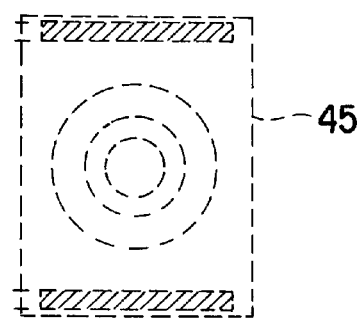
FIG. 19 is a top plan view of FIG. 18.

FIG. 18 is a cross-sectional diagram for showing a structure of a hook section 40 which supports the linings 20 and 21 at their bottom sections to the gas manifolds 30 and 32 respectively, corresponding to the portion of the cross section cut along a line D—D in FIGS. 11 and 14A respectively. FIG. 19 is a top plan view of FIG. 18.

More specifically, the hook section 40 is structured by a male hook 41 and a female hook 43 mutually engaging together, as shown in FIG. 18. A donut-shaped thin stainless panel 42 is caulked and integrated together with the make hook 41, and the stainless panel 42 is fixed to the gas manifolds 30 and 32 respectively by spot welding.

Figure 20:
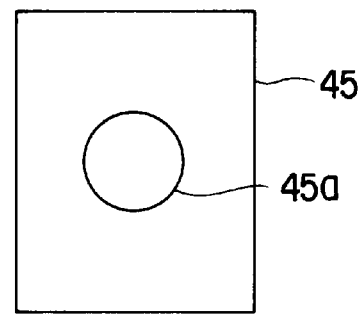
FIG. 20 a top plan view of a patch to be installed on the lining.

On the other hand, a donut-shaped sheet 44 having some stiffness is caulked and integrated together with the female hook 43, and a patch 45 made of the same material as that of the linings is thermally compressed at a predetermined position on the rear surface of the lining 20 and 21 respectively. Further, the patch 45 is provided with a hole 45a larger than the radius of the female hook 43 by "G" as shown in FIGS. 18 and 20.

By inserting the sheet 44 integrated with the female hook 43 between the patch 45 and the linings 20 and 21 respectively, the female hook 43 can support the linings 20 and 21 movably by the size "G" respectively.

Since the linings can be mounted loosely on the gas manifolds by using the above-described fixing means, it becomes possible to absorb the difference between the thermal expansion of the linings and the thermal expansion of the gas manifold.

Although the male hook is fitted on the gas manifold side and the female kook is fitted on the lining side in the example shown in FIG. 18, it is also possible to arrange such that the make kook is fitted on the gas manifold side and the female kook is fitted on the lining side.

Figure 21:
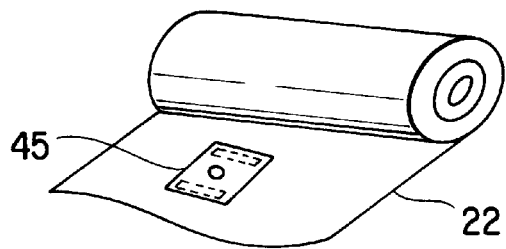
FIG. 21 is a perspective diagram for showing a state that a patch is thermally compressed to a resin sheet.
Figures 22A, 22B:
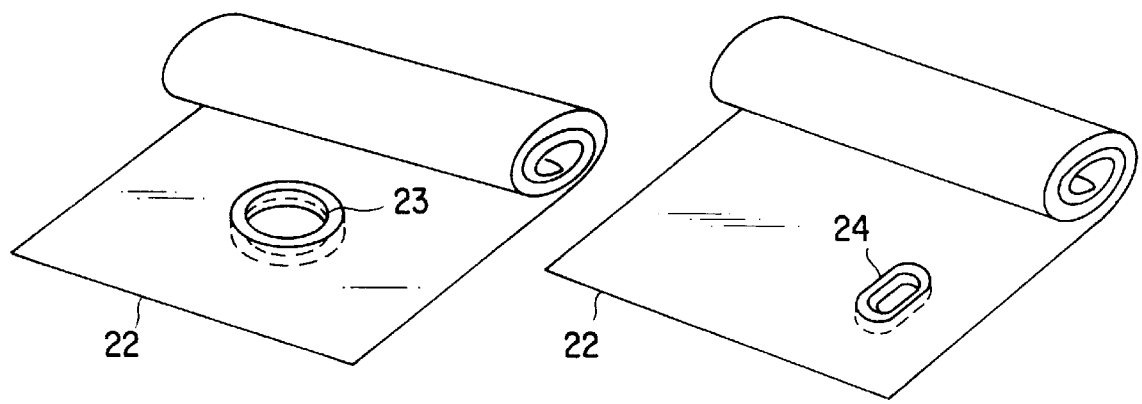
FIGS. 22A and 22B are perspective diagrams for showing a state that a flange cover is thermally compressed to a resin sheet.

FIG. 21 is a perspective diagram for showing a state that the patch 45 is thermally compressed to the PFA resin sheet 22, and FIGS. 22A and 22B are perspective diagrams for showing a state that the flange covers 23 and 24 are thermally compressed to the PFA resin sheet 22 respectively. The cross-sectional diagrams for showing the state that the PFA resin sheet 22 is fitted to the gas manifolds 30 and 32 respectively are shown in FIGS. 12, 11 and 13.

(1-1-6. Thickness of the phosphoric acid proof resin sheet-part 1)

The thickness of the phosphoric acid proof resin sheet to be used for the lining of the gas manifold is one of the most important points for protecting the metal-made gas manifold from phosphoric acid. The inventors of the present invention have checked the relationship between the thickness of the phosphoric acid proof resin sheet and the quantity of the transmission of phosphoric acid at 200° C.

Figure 23:
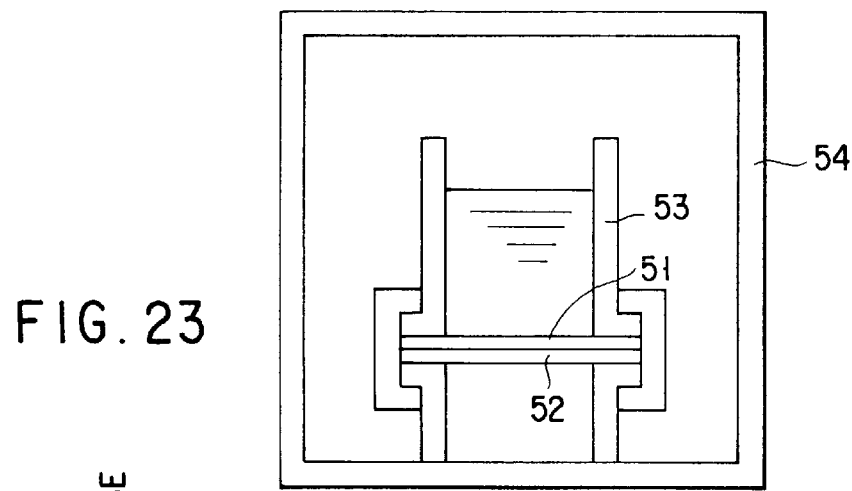
FIG. 23 is a schematic diagram for showing a structure of a testing apparatus for testing the transmissivity of phosphoric acid through a PFA resin sheet for the lining.

The present experiment was carried out by using a unit as shown in FIG. 23. A phosphoric acid proof resin sheet 51 and a phosphoric acid absorbent 53 were superimposed together, these were sandwiched by a measuring cell 53, phosphoric acid was put in the measuring cell 52 at the side of the phosphoric acid proof resin sheet 51, then the whole was put in a sealed vessel 54 and was heated at 200° C. in the vessel in a sealed state. After heating for 15,000 hours, the phosporic acid absorbent 52 was taken out and the quantity of phosphor reacted on the surface of the absorbent was analyzed, and the quantity of the transmitted phosphoric acid was obtained.

In the present experiment, a PFA resin sheet was used as the phosphoric acid proof resin sheet 51, and the thickness of this sheet was changed to 0.025 to 1.5 mm. The phosphoric acid used had a density of 95% and a mild steel used as the phosphoric acid absorbent had a thickness of 1 mm. However, it was confirmed in advance that the phosphoric acid absorbent can collect almost 100% of the transmitted phosphoric acid.

Figure 24:
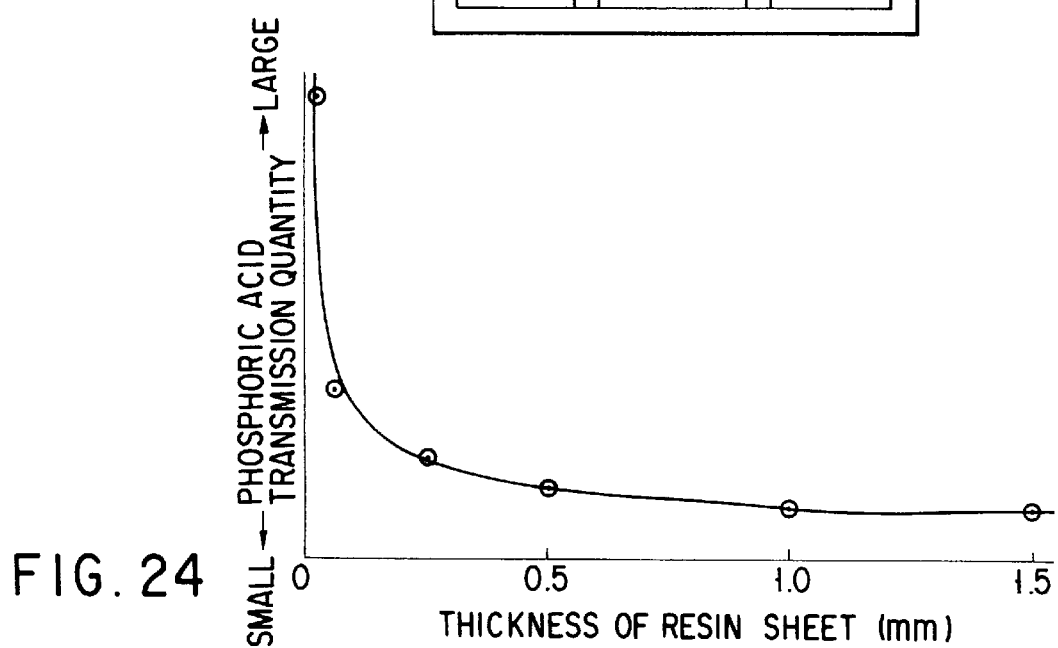
FIG. 24 is a diagram for showing a result of a test of the transmissivity of phosphoric acid through a PFA resin sheet for the lining.

FIG. 24 shows a result of the present experiment. It was found that the transmitted quantity of posphoric acid is decreased in inverse proportion to the increase in the thickness of the phosphoric acid proof resin sheet. Particularly, it was made clear that when the thickness of the phosphoric acid proof resin sheet is not larger than 0.10 mm, the transmitted quantity of phosphoric acid increases suddenly, and on the other hand, there is no significant change in the transmitted quantity of phosphoric acid when the thickness of the phosphoric acid proof resin sheet is not smaller than 1 mm.

However, when the thickness of the phosphoric acid proof resin sheet is not smaller than 1 mm, the total weight of the lining increases and it becomes difficult to fix the lining to the metal-made gas manifold, with an increased cost of material almost in proportion to the weight of the lining, which results in a cost increase. Further, if the thickness of the phosphoric acid proof resin sheet is 1 mm or above, the thermal conductivity becomes poor at the time of heating and melting the resin sheet, which results in an occurrence of a tempertture distribution in the sheet thickness direction. Thus, it becomes difficult to solve uniformly the whole resin sheet. In other words, resolution of the resin sheet starts at a portion near the heat source and the resin sheet is not solved at a portion far from the heat source, so that the fusion of the resin sheet becomes incomplete. This results in a weakening in the mechanical strength of the joined portion, leading to a breaking of the sheet and a gas leakage from this portion.

Further, the electric insulation between the cell main unit and the metal-made gas manifold which is another important function of the resin sheet for the fuel cell becomes high in proportion to this thickness of the film. For example, in the case of a fuel cell, a required breakdown voltage becomes 2,000 volts if at least 10 times of the rated voltage is necessary as the breakdown voltage. When the PFA resin sheet of a thickness of 1 mm is used as the phosphoric acid proof resin sheet, for example, the required breakdown voltage is 20,000 volts. Therefore, the required film thickness is at least 0.1 mm.

Accordingly, when the resin sheet to be used for the lining of the gas manifold has the thickness of 0.1 to 1 mm, it becomes possible to provide a highly reliable gas manifold which excels in being phosphoric acid proof and with secure electric insulation.

(1-1-7. Thickness of the phosphoric acid proof resin sheet-part 2)

As a result of an investigation made into the quantity of phosphoric acid exhausted into a gas manifold from an actual cell, it was found that there is a large difference in the quantity between the positions of a fuel entrance, a fuel exit, an air entrance and an air exit. To be more specific, it was known that phosphoric acid is exhausted by a larger quantity at the air side gas manifold than at the fuel side gas manifold, and that there is a tendency that phosphoric acid is exhausted by a larger quantity at the exit side than at the entrance side for both the fuel side gas manifold and the air side gas manifold.

Figure 25:
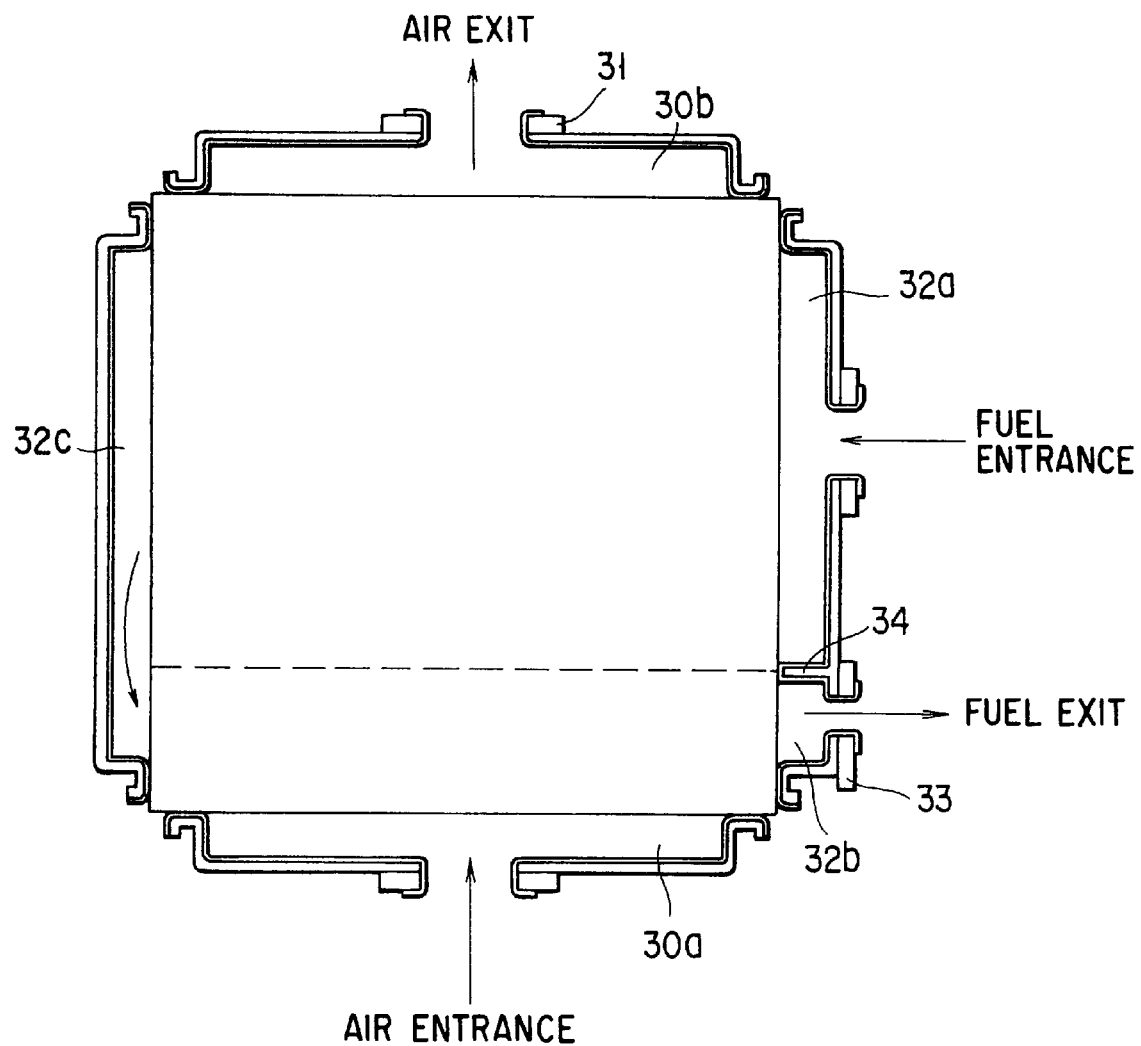
FIG. 25 is a diagram for showing a flow of gas in the manifold.

Further, it is necessary to change the thickness of the resin sheet by taking into account a gas distribution system. For example, in the case of a gas distribution as shown in FIG. 25, the exhaust quantity of phosphoric acid is the largest at a gas manifold 30*b* at the air exit side, then the exhaust quantity of phosphoric acid is decreased in the declining order at a gas manifold 32*c* at the fuel turn side and at gas manifolds 32*b* and 32*a* at the fuel exit and entrance sides respectively, with the least exhaust quantity of phosphoric acid at a gas manifold 30*a* at the air entrance side. Therefore, it is reasonable to change the thickness of the resin sheet in proportion to the exhaust quantity of phosphoric acid.

For example, it is possible to change the thickness of the resin sheet for structuring the lining from 0.5 mm to 0.1 mm in the order of the positions at the air exit side, at which the exhaust quantity of phosphoric acid is the largest, the fuel turn side, the fuel exit and entrance sides, and the air entrance side.

By changing the thickness of the resin sheet in proportion to the exhaust quantity of phosphoric acid, it becomes possible to prevent the transmission of phosphoric acid rationally and securely.

(1-1-8. Joining thicjness of the phosphoric acid resin sheet)

Then, the inventors of the present invention investigated the joining thickness of the four corners (corner sections) of the phosphoric acid proof resin sheet to be used for the lining. As a result, it was found that when the joining thickness is 1 mm or less, a sufficient joint strength cannot be obtained and there also occurs a portion where the reliability is deteriorated due to variations in the joining. On the other hand, when the joining thickness is 10 mm or more, the front end of the joining section is brought into contract with the four corners of the metal-made gas manifold, and when the gas flows into the gas manifold, the front end of the joining is bent by this pressure, with an unnecessarily large stress concentrated to the joining section. For example, when the shearing stress is concentrated, there is a risk of damaging the sheet at the joining section.

Further, as a result of checking the joint strength by a tear-off test of two sheets, the sheets were torn off at a portion within the joining distance of 10 mm in most cases, and therefore, it was made clear that 10 mm is sufficient for the joining distance in order to obtain sufficient joint strength.

From the above, it becomes possible to improve the strength of the lining by setting 1 to 10 mm as the joining thickness of the four corners of the phosphoric acid proof resin sheet to be used for the lining, and thereby to provide a gas manifold with excellent reliability.

(1-1-9. Method of joining the phosphoric acid proof resin sheet-heating temperature)

Next, as a result of investigating a method of joining the four corners of the phosphoric acid proof resin sheet to be used for the lining, it was found that a method of heating the resin sheets at a temperature at the mealting point or above and then compressing the resin sheets is suitable.

To be more specific, two resin sheets are superimposed to face each other at the joining section, the front end of the superimposed portion is heated by a heater at a temperature of the melting point or above by compressing this portion, and then the two resin sheets are joined together. For example, in the case of the PFA resin sheet, its melting point is about 310° C., and the two sheets cannot be joined completely at this melting point or below because the molecules between the two sheets are not intertwined sufficiently at this temperature. On the other hand, when the two sheets are heated at the melting point or above and compressed, the two sheets are considered to be joined together by a sufficient intertwining of molecules between the two sheets.

As explained above, since the fourcorners of the phosphoric acid proof resin sheet to be used for the lining can be joined securely by hearint and compressing the resin sheets together at the melting point or above, it becomes possible to improve the strength of the lining and to provide a gas manifold with high reliability.

Further, it is desirable that the heating temperature at the time of joining the PFA resin sheet is within the range from its melting point to 400° C., and it is more desirable to set the heating temperature within 315 to 340° C. for a complete joining. This is because when the heating temperature at the joining time is 315° C. or below, there is a risk of the local temperature becoming 310° C. or below depending on the temperature distribution and the joining at this portion becomes insufficient accordingly. This is also because the heating time needs to be longer at the lower temperature, which is not economical.

On the other hand, when the heating temperature at the joining time is 340° C. or above, the melting viscosity of the PFA resin sheet is lowered and the sheet flows easily, which results in a smaller thickness of the joining section leading to a reduction in the strength of the joining section. Further, when the heating temperature at the joining time increased to 400° C. or above, resolution starts on the sheet surface, which results in a generation of a poisonous gas and foaming leading to an extreme reduction in the joint strength.

As explained above, it is desirable that the heating temperature at the time of joining the PFA resin sheet is within the range from its melting point to 400° C., and is more desirable to compress the sheets at the melting point plus 5 to 30° C. As a result, it becomes possible to connect the sheets securely in a short time, so that the strength of the lining can be improved and a highly reliable gas manifold can be provided.

(1-1-10. Method of joining the phosphoric acid proof resin sheet-heating time)

Next, as a result of investigating into the heating time for joining the phosphoric acid proof resin sheet to be used for the lining, it was found that the heating for 5 to 300 seconds is desirable. This is because when the heating time is 5 seconds or below, most of heat is absorbed by the heater or other members and a complete joining cannot be achieve accordingly. When the heating time was 5 seconds or below, the failure rate was 50% or above.

On the other hand, when the heating time is 300 seconds or longer, the heating time is too long to make the joining section creep and become thinner, which results in a reduction in the strength of the joining section. Further, taking a long time for the joining is not economical.

From the above, it is desirable that the heating time for the joining is set at 5 to 300 seconds. As a result, a highly reliable gas manifold can be provided.

(1-1-11. Method of joining the phosphoric acid proof resin sheet-part 1)

The inventors of the present invention have inestigated various methods of joining the phosphoric acid proof resin sheet to be used for the lining, to seek an optimum joining method.

In other words, there are an external heating methods of heating from the outside and an internal heating method of heating from the inside, as methods of joining by heating. In this case, a heat welding and an impulse welding were investigated as the methods of heating from the outside. Also, an ultrasonic wave welding and a high-frequency welding were investigated as the method of heating from the inside.

As a result of the investigations, it was not possible to join the corner sections of the phosphoric acid proof resin sheet to be used for the lining, by either the ultrasonic wave welding or the high-frequency welding as the method of heating from the inside. This is considered because the heating of the sheet itself is not sufficient since the phosphoric acid proof resin is made of stiff molecules.

On the other hand, of the methods of heating from the outside, the heat welding is a joining method at low cost with a simple unit. According to this method, however, after finishing a joining by heating, a heated panel is separated while it is hot, so that there is a tendency that the strength of the joining section is deteriorated. Further, it was found that this method has a drawback that there is a large variation in the joint strength.

On the other hand, the impulse welding is a method of heating and joining sheets by flowing a large-capacity current in a short time with a small capacity of the heater, and for keeping a compressed state after the current supply is interrupted until the temperature of the joining section is lowered, and taking out the joining section after the cooling.

According to the impulse welding, it becomes possible to join the sheets in a short time, with a beautiful finish and with the tendency that the joint strength is higher than that achieved by the heat welding. Further, it was found that there is a small variation in the joint strength and a stable joining can be achieved by this method. Moreover, it was found that since it is possible to join sheets in a short time despite a minor variation in the temperature, the sheet joining can be achieved under the conditions of a relatively wide range of heating temperature, heating time, compressive plane pressure at the time of heating, respectively. This is considered becaue of a high melting viscosity and a relatively small width of the molecular weight distribution in the case of he phosphoric acid resin sheet like the PFA resin sheet.

From the above, by joining the corner sections of the phosphoric acid proof resin sheet to be used for the lining based on the impulse welding, it becomes possible to provide a highly reliable gas manifold with excellent joint strength.

(1-1-12. Method of Joining the Phosphoric Acid Proof Resin Sheet-part 2)

It was found that in the impulse welding to be used for the joining of the corner sections of the phosphoric acid proof resin sheet for the lining, the sheet joining time can be shortened and the joint strength can be increased when the impulse weld joining is carried out by sandiwiching a PFA film thinner than the resin sheet between the two resin sheets to be joined.

Although a clear reason for the above is not known, it is considered that the two resin sheets can be joined completely because the PFA film put between the two resin sheets is solved completely to function as an adhesive when heated because of its small thickness and small thermal capacity.

Further, as a result of investigating the effect of the thickness of the thin PFA film sandwiched between the two resin sheets, an increase in the strength was recognized for the PFA film having the thickness of 0.01 to 0.04 mm. Among others, the joint strength increased most for the film having the thickness of 0.025 mm.

As explained above, by sandwiching the PFA film of the thickness 0.01 to 0.04 mm between the two resin sheets, it becomes possible to increase the joint strength by the impulse welding, so that a highly reliable phosphoric acid proof gas manifold can be provided.

(1-1-13. Method of Joining the Phosphoric Acid Proof Resin Sheet-part 3)

Next, the compressive plane pressure of an impulse heater at the joining time was investigated in the impulse welding to be used for the joining of the corner sections of the phosphoric acid proof resin sheet for the lining.

To be more specific, by using a PFA sheet of 0.5 mm thickness as the resin sheet, the joint strength was investigated by changing the compressive plane pressure of the impulse heater within a range from 0.025 to 0.6 MPa, at a constant current density of a current to be flown to the impulse heater and for a constant pressuring time.

Figure 26:
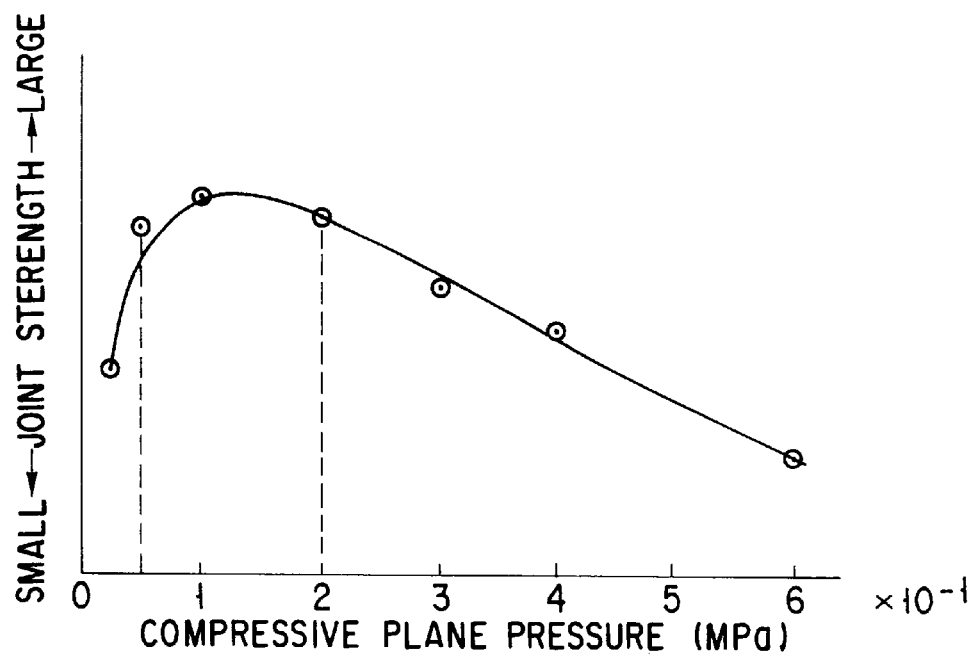
FIG. 26 is a diagram for showing a relationship between the compressive plane pressure and the joint strength of a PFA resin sheet for the lining.

FIG. 26 shows a result of the above investigation. As is clear from the diagram, it was found that a peak of the joint strength exists when the compressive plane pressure of the impulse heater is in the range from 0.05 to 0.2 MPa and the joint strength tends to be lowered in other pressure ranges.

This is considered because the compressive plane pressure of about 0.05 to 0.2 MPa is necessary in order for the molecules between the two sheets to be intertwined together for the joining of the thermally fused sheets. Further, when the compressive plane pressure is 0.05 MPa or below, the intertwining of the molecules is not sufficient. On the other hand, when the compressive plane pressure is 0.2 MPa or above, the intertwining of the molecules is sufficient but the thickness at the joining section becomes smaller because of an excessively compressive plane pressure. The above is considered why the joint strength is lowered in these ranges of the compressive plane pressure.

As explained above, in the joining by the impulse welding, about 0.05 to 0.2 MPa is desirable as the compressive plane pressure of the impulse heater at the joining time. At this compressive plane pressure, sheets can be joined securely with high joint strength, and a highly reliable phosphoric acid proof gas manifold can be provided.

(1-1-14. Method of Joining the Phosphoric Acid Proof Resin Sheet-part 4)

Next, an influence of the cooling temperature was investigated in the impulse welding to be used for the joining of the corner sections of the phosphoric acid proof resin sheet for the lining. In other words, a temperature to which the joining section should be cooled before the joining section is taken out in order to obtain the highest joint strength was investigated.

To be more specific, by using a PFA sheet of 0.5 mm thickness as the resin sheet, the joint strength was investigated by changing the cooling temperature at a constant current density of a current to be flown to the impulse heater, for a constant heating time and at a constant compressive plane pressure.

Figure 27:
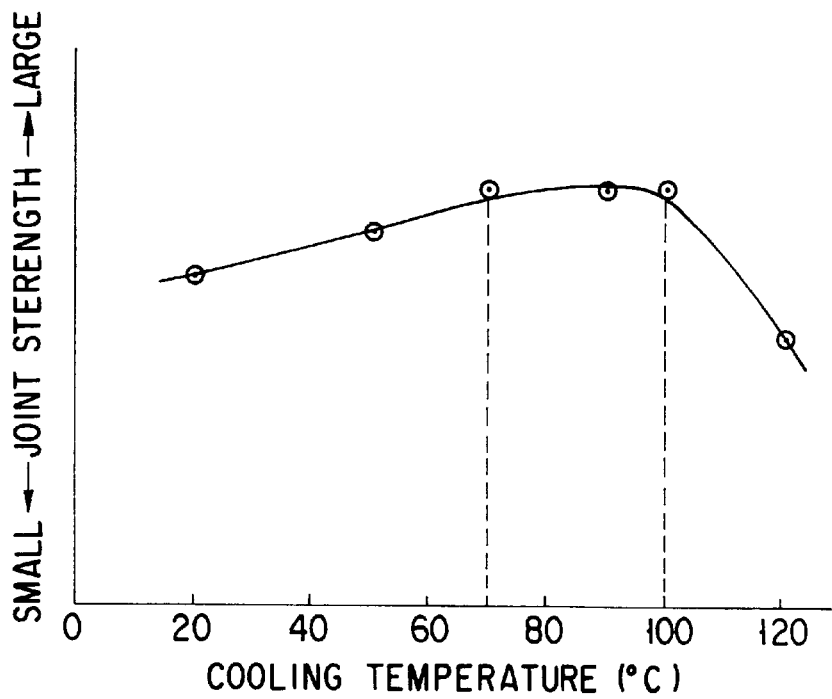
FIG. 27 is a diagram for showing a relationship between the cooling ultimate temperature and the joint strength of the PFA resin sheet for the lining.

FIG. 27 shows a result of the above investigation. As is clear from the diagram, it was found that a peak of the joint strength exists when the cooling temperature is in the range from 70 to 100° C. and the joint strength tends to be lowered in other temperature ranges.

This is considered because the cooling is not sufficient when the cooling temperature is 100° C. or above and the joint strength is low because of the process of transition from melting to caking. On the other hand, when the cooling temperature is 70° C. or below, the cooling time becomes longer and since the joining section is receiving compressive plane pressure during this period, the joining section creeps slightly and the thickness is reduced. Thus, the strength is considered to be lowered.

In other words, the glass transition temperature at which the state of caking is considered to be established in the transition process from melting to caking is considered to be within the range from 70 to 100° C. Thus, it is desirable to cool the joining section at a temperature not higher than the glass transition temperature. With this arrangement, it becomes possible to provide a highly reliable phosphoric acid proof gas manifold with high joint strength.

(1-2. Embodiment of the Method of Installing Linings on Gas Manifolds)

One embodiment of the method of installing linings on gas manifolds will be explained below.

At first, a cut line is marked with an oil pen on the phosphoric acid proof resin sheet by taking account of a predetermined thermal expansion which matches the shape of the gas manifold. In this case, the four corners are cut so that the sheet is formed in a box shape when folded (front angle 138° C.). The rest of the cut at the four corners may be cut out after the sheet has been folded to form a box shape.

Then, small patches with hole are joined by compression to the phosphoric acid proof resin sheet at several positions for fixing the sheet to the gas manifold.

A flange cover formed in advance by rounding and joining the phosphoric acid proof resin sheet by compression in a sleeve shape, with both ends thermally formed in a flange shape, is mounted on the gas manifold by joining by compression at a position corresponding to the air intake and exhaust flange section.

Next, the joining sections of the four corners of the phosphoric acid proof resin sheet are joined by compression in the state the resin sheets are faced together. The four sides are folded to match the four corners to form a box shape, thus providing a lining.

Then, a male hook provided in advance by caulking and integrating a thin stainless panel, is built into the small patch joined by compression to the phosphoric acid proof resin sheet. On the other hand, a female hook provided in advance by caulking and integrating a donut-shaped sheet, is mounted on the gas manifold by spot welding at a position corresponding to the male hook.

Then, the box-shaped manifold fitted with the male hook is built into the gas manifold fitted with the female hook, the flange cover is mounted on the flange section of the gas manifold, and the male hook of the lining and the female hook of the gas manifold are engaged together for being fixed together.

Last, the periphery of the lining is bent to match the brim section of the peripheral section of the gas manifold, and the end section of the bent lining and the brim section of the gas manifold are sandwiched together by clamping to fix these portions together at least at two positions on each side.

(1-3. Operation and Effect of the First Mode of Implementation)

As described above, according to the present mode of implementation, by covering the whole inner plane of the gas manifold with the lining structured by the phosphoric acid proof resin sheet, the base material of the metal-made gas manifold can be prevented from being corroded by phosphoric acid. Further, since an electric insulation peripheral plane distance can be secured sufficiently by taking sufficient size for the folding end section of the gas manifold, it becomes possible to provide a gas manifold of high phosphoric acid proof and with high electric insulation.

Further, by mounting the lining loosely on the gas manifold so as to be able to absorb sufficiently a difference of thermal expansion, instead of mounting the lining directly on the gas manifold, it becomes possible to cope with the thermal expansion of the sheet due to changes in the temperature at the time of starting and stopping the operation of the cell unit and when the load is changed.

Furthermore, since the lining and the gas manifold can be manufactured separately, it becomes possible to reduce the construction period.

2. Second Mode of Implementation

In the present mode of implementation, there has been made an improvement in the gas manifold in order to prevent a breaking of the lining to be provided on the metal-made gas manifold.

According to the lining as shown in the first mode of implementation, it is difficult to process finely the bending radius at the bending section. Therefore, at the engagement section between the bending section of the lining and the bending section of the metal-made gas manifold, it is necessary to minimize the bending radius at the metal-made gas manifold side. As a result of repeated investigations into the bending radius of the metal-made gas manifold side, the inventors of the present invention have found that when the bending radius is set at 2 mm or smaller, the engagement between the bending section of the lining and the bending section of the metal-made gas manifold side becomes smoother so that a breaking of the lining can be prevented.

Further, the metal-made gas manifold is formed not only by bending, but a part of the gas manifold is formed by welding. Particularly, since the four corner sections and the lip sections connecting to these sections are formed by welding, it is necessary to process the projected portion of the welding bead in a flat shape so as not to damage the lining. Therefore, if only the projected portion is finished by a grinder, the contact between this portion and the lining becomes smooth, and there is no risk of damaging the lining. Further, it was found that if a heat-resisting coating is coated on at least the inner plane of the metal-made gas manifold, a higher smoothing effect with the lining can be obtained.

As explained above, according to the present mode of implementation, since it becomes possible to make the contact between the metal-made gas manifold and the lining smoother, a breaking of the lining by the metal-made gas manifold can be prevented.

3. Third Mode of Implementation

The present mode of implementation has an object of confirming the soundness of the lining by monitoring the pressure between the lining and the gas manifold.

Figure 28:
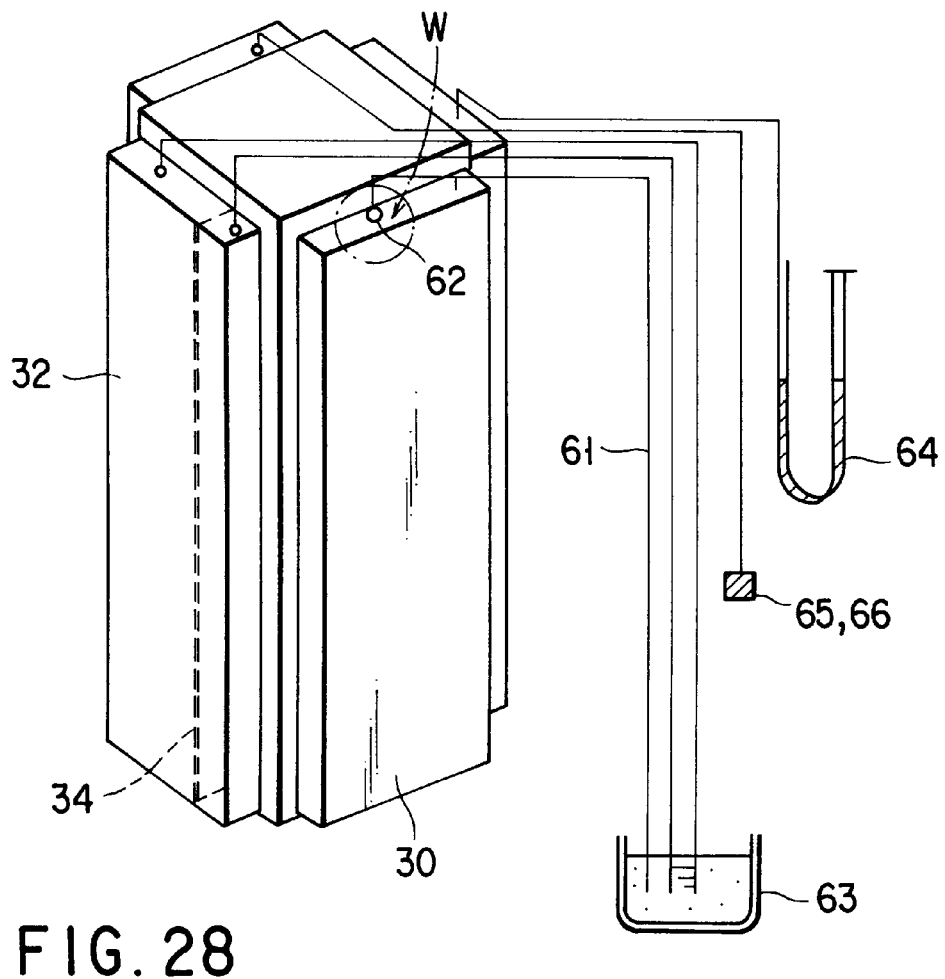
FIG. 28 is a conceptional diagram for showing a pressure monitoring unit for monitoring the pressure between the lining and the gas manifold.
Figure 29:
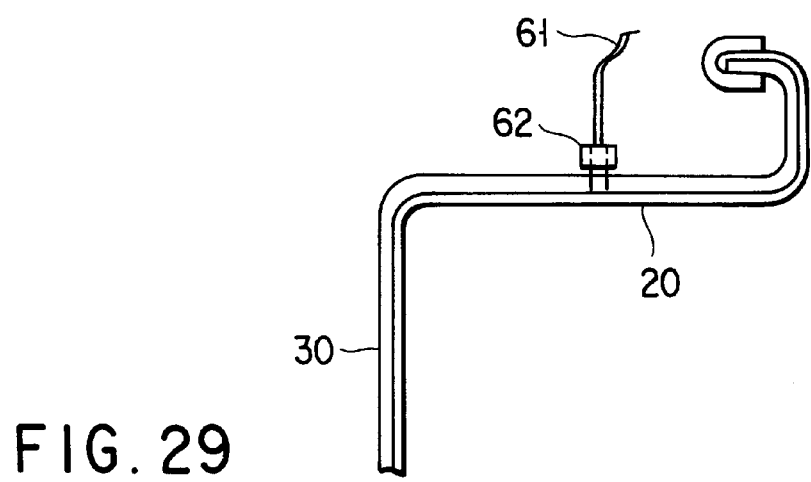
FIG. 29 is a cross-sectional diagram for showing a structure of a pressure detecting plug section for detecting the pressure between the lining and the gas manifold.

According to the present mode of implementation, a means for monitoring the pressure between the lining and the gas manifold is provided at each gas manifold, as shown in FIGS. 28 and 29. To be more specific, a pressure measuring plug 62 is mounted air-tight on the gas manifold and has one side end opening in a space between the lining and the gas manifold and has the other side end opening connected to one side end opening of a pressure drawing tube 61. The other side end opening of the pressure drawing tube 61 is inserted into water of a water cup 63 so as to be able to detect air bubbles easily.

Further, when the pressure drawing tube 61 is structured by a tube of which inside an is visible, and a U-shaped disposition section is provided in the tube, and if the U-shaped disposition section is charged with water, with one side end opened to the atmosphere, air-tightness can be maintained and this U-shaped disposition also functions as a U-shaped manometer 64. With this structure, it becomes possible to monitor the pressure between the lining and the gas manifold.

Further, as a method of automatically monitoring the pressure between the lining and the gas manifold, when a pressure gauge 65 for transmitting a pressure signal or a flow meter 66 for transmitting a flow signal is connected to the pressure drawing tube 61 so as to measure the pressure between the lining and the gas manifold and a leak flow volume, it becomes possible to confirm the soundness of the lining throughout the time.

The reason why it is possible to confirm the soundness of the lining by monitoring the pressure between the lining and the gas manifold as described above is as follows. If a leakage has occurred from the joining section of the lining or from the PFA resin sheet itself, the internal pressures of the air side gas manifold and the fuel side gas manifold become higher than the atmospheric pressure because of the backing pressure.

4. Fourth Mode of Implementation

Figure 30:
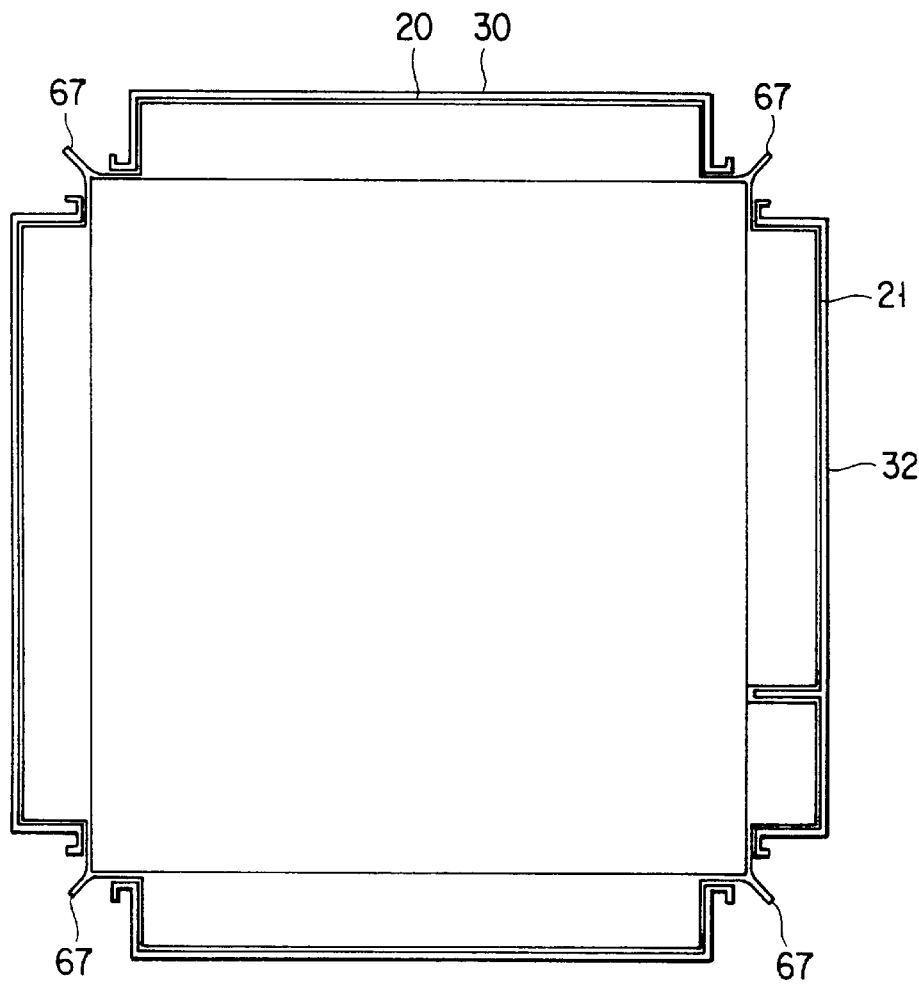
FIG. 30 is a cross-sectional diagram for showing a state that linings mounted on the adjacent gas manifolds are joined together.

The present mode of implementation is an improvement of the joining section between the air side lining and the fuel side lining. To be more specific, as shown in FIG. 30, both sides of the air side lining 20 and the fuel side lining 21 are structured to be long, and both linings are joined at end sections 67.

With the above-described structure, since the corner sections of the cell stack unit 13 exposed to the atmosphere can be covered at the end sections of the air side lining 20 and the fuel side lining 21, it becomes possible to prevent a leakage of flammable gas from the cell stack unit 13, so that a fuel cell power generating unit with a high safety level can be obtained.

5. Fifth Mode of Implementation

The present mode of implementation is a forming of a lining by blow forming.

Figure 31:
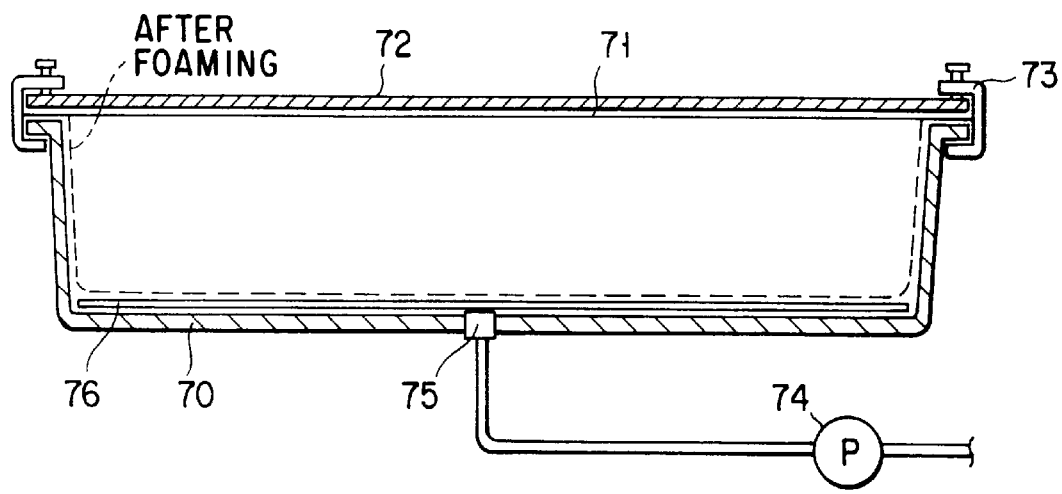
FIG. 31 is a cross-sectional diagram for showing an example that a lining is formed by blow forming.

As shown in FIG. 31, a phosphoric acid proof resin sheet 71 is placed on the surface of a metal mold 70 of the same shape as that of a gas manifold, an iron plate 72 is placed on this, and the surrounding is fixed by clamps 73 for sealing. On the bottom surface of the metal mold 70, a connection section 75 is provided to be connected to a vacuum pump 74 installed in the outside, and a pressure unifying plate 76 is disposed to cover the whole bottom surface. The pressure unifying plate 76 is made of a porous material and is used for making a vacuum uniformly on the bottom plane.

Next, the metal mold 70 covered with the phosphoric acid proof resin sheet 71 is put into a heating furnace and is heated while being suctioned by the vacuum pump 74 at a temperature not lower than the softening point and not higher than the melting point of the phosphoric acid proof resin sheet until the sheet becomes the same shape as that of the metal mold 70. Thereafter, the sheet is cooled suddenly to obtain a lining formed in a box shape.

The reason why the heating temperature at the time of forming the lining is set at a temperature not lower than the softening point and not higher than the melting point of the phosphoric acid proof resin sheet for structuring the lining is as follows.

This is because the sheet is not extended sufficiently and the forming becomes difficult when the temperature is not higher than the softening point. On the other hand, at a temperature not lower than the melting point, the sheet is affected easily by the temperature distribution, and if there is any portion of the sheet where the temperature is higher than at the other portions, the sheet at this portion is extended extremely so that the sheet becomes thinner. This has a risk of permeation of phosphoric acid. Further, in the extreme case, the sheet is broken so that the lining cannot be formed.

As explained above, when the lining is formed by blow forming, it becomes possible to obtain a highly reliable lining easily.

As described above, according to the present invention, it is possible to provide a fuel cell which is excellent in both phosphoric acid proof and electric insulation and which has sufficient corrosion proof over a long period. Further, it is possible to provide a fuel cell which can prevent a breaking of the lining. Furthermore, it is possible to provide a fuel cell having a means for confirming the soundness of the lining. Moreover, it is possible to provide a highly reliable method of installing linings on gas manifolds of a fuel cell.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell comprising:
 a cell stack unit;
 gas manifolds disposed on planes of said cell stack unit;
 linings prepared by a phosphoric acid proof resin sheet, said linings being to be removably mounted on inner planes of said gas manifolds, each of said linings being formed in advance to have a size smaller than that of an inner plane of each gas manifold by a size substantially corresponding to the size of a thermal expansion of said lining during the operation of the fuel cell, wherein said linings have first hooks, and said gas manifolds have second hooks at predetermined positions at which said second hooks are engaged with said first hooks provided on said linings.

2. A fuel cell according to claim 1, wherein said phosphoric acid proof resin sheet for structuring the lining is either a perfluoroalkoxyethylene-tetrafluoroethylene copolymer resin sheet or an FEP (hexafluoropropylene-tetrafluoroethylene copolymer) resin sheet.

3. A fuel cell according to claim 1, wherein said phosphoric acid proof resin sheet for structuring the lining is a polychlorotetrafluoroethylene resin sheet.

4. A fuel cell according to claim 1, wherein said phosphoric acid proof resin sheet for structuring the lining is provided with either female hooks or male hooks and the inner plane of said gas manifold has either male hooks or female hooks at predetermined positions at which said hooks are engaged with said hooks provided on said lining.

5. A fuel cell according to claim 4, wherein said phosphoric acid proof resin sheet for structuring the lining is provided with patches with holes and either female hooks or male hooks are movably fitted between said sheet and said patches.

6. A fuel cell according to claim 1, wherein said phosphoric acid proof resin sheet for structuring the lining has a thickness of 0.1 mm to 1 mm.

7. A fuel cell according to claim 1, wherein said phosphoric acid proof resin sheet for structuring the lining has corner sections each having a joining thickness of 1 mm to 10 mm.

8. A fuel cell according to claim 1, wherein said phosphoric acid proof resin sheet for structuring the lining has its corner sections thermally compressed at a temperature not lower than a melting point temperature of said resin sheet.

9. A fuel cell according to claim 1, wherein said phosphoric acid proof resin sheet for structuring the lining has its joining sections joined by impulse welding.

10. A fuel cell according to claim 9, wherein the heating temperature at the time of joining by impulse welding is set within a range from a melting point temperature of said phosphoric acid proof resin sheet for structuring the lining to 400° C.

11. A fuel cell according to claim 9, wherein the heating temperature at the time of joining by impulse welding is set between 5 seconds and 300 seconds.

12. A fuel cell according to claim 9, wherein at the time of carrying out the impulse welding, a perfluoroalkoxyethylene-tetrafluoroethylene copolymer) film having a thickness of 0.01 to 0.04 mm is sandwiched between joining planes of said phosphoric acid proof resin sheet for structuring the lining.

13. A fuel cell according to claim 9, wherein said compressive plane pressure at the time of joining by impulse welding is set at 0.05 to 0.2 MPa.

14. A fuel cell according to claim 9, wherein the cooling temperature at the time of joining by impulse welding is set at a level not higher than a glass transition temperature of said phosphoric acid proof resin sheet for structuring the lining.

15. A fuel cell according to claim 1, wherein said lining is formed in a box shape with a brim after cut portions of four corner joining sections of said phosphoric acid proof resins sheet have been disconnected at an angle of 138±3 degrees, with said cut portions faced together and joined by compression.

16. A fuel cell according to claim 1, wherein said gas manifolds include a section for exhausting a gas of said gas manifold is fitted with a flange cover.

17. A fuel cell according to claim 16, wherein said flange cover is joined by thermal compression with the bottom plane of said phosphoric acid proof resin sheet for structuring the lining.

18. A fuel cell according to claim 16, wherein said flange cover is formed by pressing an end section at an opening side of said phosphoric acid proof resin sheet formed in a ring shape for structuring the lining.

19. A fuel cell according to claim 16, wherein said flange cover is structured by a perfluoroalkoxyethylene-tetrafluoroethylene copolymer resin sheet.

20. A fuel cell according to claim 1, wherein said lining is also installed in a divider section for separating an inside space formed by fuel-side gas manifolds at a fuel side.

21. A fuel cell according to claim 1, wherein an external peripheral section of said phosphoric acid proof resin sheet is bent along a brim section at a peripheral section of said gas manifold and is sandwiched and fixed together with said gas manifold brim section by clamping.

22. A fuel cell according to claim 1, wherein the thickness of said phosphoric acid proof resin sheet for structuring the lining is changed based on an exhaust quantity of phosphoric acid at each gas manifold disposed on the side plane of said cell stack unit.

23. A fuel cell according to claim 1, wherein said gas manifolds include an air supplying side gas manifold, and the thickness of said lining for said air supply side gas manifold is made smaller than the thickness of the linings for the other sections.

24. A fuel cell according to claim 1, wherein a heat-resisting coating is coated on at least the inner plane of each gas manifold.

25. A fuel cell according to claim 1, wherein said pressure monitoring means is structured by a pressure drawing tube of which one side end opening is connected to a pressure measuring plug provided on said gas manifold and the other side end opening is inserted into water.

26. A fuel cell according to claim 25, wherein a U-shaped disposing section is formed in a state that the other side end opening of said pressure drawing tube is opened to the atmosphere and water is filled in at least said U-shaped disposing section.

27. A fuel cell according to claim 1, wherein said pressure monitoring means is structured by a pressure drawing tube of which one side end opening is connected to a pressure measuring plug provided on said gas manifold and the other side end opening is connected with a pressure gauge.

28. A fuel cell according to claim 1, wherein said pressure monitoring means is structured by a pressure drawing tube of which one side end opening is connected to a pressure measuring plug provided on said gas manifold and the other side end opening is connected with a flow meter.

29. A fuel cell according to claim 1, wherein each side plane covering section of said phosphoric acid proof resin sheet for structuring the lining is extended and is connected with an end section of the lining of an adjacent gas manifold, to cover each corner section of said cell stack unit.

30. A method of manufacturing a fuel cell having a cell stack, gas manifolds and linings, which comprises the steps of:

obtaining linings by forming a phosphoric acid proof resin sheet in a box shape to match the shape of each of said gas manifolds, and forming each lining to have a size smaller than that of the inner plane of each of said gas manifolds by a size substantially corresponding to the size of a thermal expansion of the lining during the operation of the fuel cell;

installing said linings on the inner planes of said gas manifolds; and disposing said gas manifolds on planes of said cell stack unit, wherein the obtaining step includes a step of bending an external peripheral section of said phosphoric acid proof resin sheet along a brim section at a peripheral section of said each gas manifold, and the installing step includes a step of sandwiching and fixing said linings together with the gas manifold brim section by clamping.

31. A method of manufacturing a fuel cell having a cell stack, gas manifolds and linings, which comprises the steps of:

obtaining linings, by forming a phosphoric acid proof resin sheet in a box shape to match the shape of each of said gas manifolds, and forming each of said linings such that said each lining has a size smaller than that of an inner plane of each of said gas manifolds by a size substantially corresponding to a size of a thermal expansion of said linings during an operation of the fuel cell;

providing either female hooks or male hooks on said linings to be engaged with said hooks installed on said linings, at predetermined positions on the inner plane of each of said gas manifolds;

installing said linings on the inner planes of said gas manifolds by engaging both the female and male hooks together; and disposing said gas manifolds on planes of said cell stack unit;

wherein the obtaining step includes a step of bending an external peripheral section of said phosphoric acid proof resin sheet along a brim section at a peripheral section of each of said gas manifolds, and the installing step includes a step of sandwiching and fixing said linings together with the gas manifold brim section by clamping.

32. A fuel cell according to claim 1, wherein said lining is formed by forming said phosphoric acid proof resin sheet in a box shape by blow forming.

33. A fuel cell according to claim 32, wherein the heating temperature at the time of blow forming the lining is set within a range not lower than the softening point and not higher than the melting point of said phosphoric acid proof resin sheet respectively.

34. A fuel cell comprising:

a cell stack unit;

gas manifolds disposed on planes of said cell stack unit;

linings prepared by a phosphoric acid proof resin sheet, said linings being to be removably mounted on inner planes of said gas manifolds, each of said linings being formed in advance to have a size smaller than that of an inner plane of each of said gas manifolds by a size substantially corresponding to a size of a thermal expansion of said each lining during an operation of the fuel cell; and pressure monitoring means for monitoring the pressure between said linings and said gas manifolds.

* * * * *